United States Patent
Lo et al.

(10) Patent No.: US 11,950,112 B2
(45) Date of Patent: Apr. 2, 2024

(54) USER EQUIPMENT FOR BEAM FAILURE DETECTION AND BEAM FAILURE DETECTION METHOD

(71) Applicant: Acer Incorporated, New Taipei (TW)

(72) Inventors: Li-Chung Lo, New Taipei (TW); Chien-Min Lee, New Taipei (TW)

(73) Assignee: ACER INCORPORATED, New Taipei (TW)

(*) Notice: Subject to any disclaimer, the term of this patent is extended or adjusted under 35 U.S.C. 154(b) by 204 days.

(21) Appl. No.: 17/372,825

(22) Filed: Jul. 12, 2021

(65) Prior Publication Data

US 2022/0046438 A1 Feb. 10, 2022

Related U.S. Application Data

(60) Provisional application No. 63/061,197, filed on Aug. 5, 2020.

(51) Int. Cl.
*H04W 24/04* (2009.01)
*H04L 5/00* (2006.01)
*H04W 72/21* (2023.01)

(52) U.S. Cl.
CPC ........... *H04W 24/04* (2013.01); *H04L 5/0048* (2013.01); *H04W 72/21* (2023.01)

(58) Field of Classification Search
CPC ..... H04W 24/04; H04B 7/088; H04B 7/0408; H04B 17/309
See application file for complete search history.

(56) References Cited

U.S. PATENT DOCUMENTS

| 10,813,157 B1* | 10/2020 | Bai ................ H04W 76/19 |
| 2019/0173740 A1 | 6/2019 | Zhang et al. |
| 2019/0174385 A1 | 6/2019 | Sang et al. |
| 2019/0281480 A1 | 9/2019 | Wei et al. |

(Continued)

FOREIGN PATENT DOCUMENTS

| CN | 110896546 A | 3/2020 | |
| WO | WO-2008127165 A1 * | 10/2008 | ........ H04W 72/1231 |
| WO | 2019/130064 A1 | 7/2019 | |

(Continued)

OTHER PUBLICATIONS

Japanese language office action dated Aug. 23, 2022, issued in application No. JP 2021-129324.

(Continued)

*Primary Examiner* — Kevin Kim
(74) *Attorney, Agent, or Firm* — McClure, Qualey & Rodack, LLP

(57) ABSTRACT

A UE for beam failure detection is provided. The RF signal processing device of the UE assesses a first radio link quality according to a first BFD-reference signal (BFD-RS) set including at least one reference signal, communicating with a plurality of transmission/reception points (TRPs) which include at least a first TRP and a second TRP. The processor of the UE is coupled to the RF signal processing device. When the first radio link quality is below a threshold, the processor generates a first indication, wherein the first indication is a first beam failure instance (BFI) or the first BFD-RS set. The processor enables a first timer and a first counter according to the first indication.

42 Claims, 26 Drawing Sheets

(56) References Cited

U.S. PATENT DOCUMENTS

2020/0266872 A1* 8/2020 Bai .................. H04W 72/0446
2021/0028849 A1* 1/2021 Chin .................. H04W 52/028

FOREIGN PATENT DOCUMENTS

| WO | WO-2019193239 A1 * | 10/2019 | ............. H04B 17/24 |
| WO | WO-2020092752 A1 * | 5/2020 | ........... H04B 7/0417 |
| WO | WO-2020222144 A1 * | 11/2020 | ........... H04B 7/0695 |

OTHER PUBLICATIONS

Samsung; "On Ref.17 FeMIMO WI;" 3GPP TSG RAN WG1 #101; Jun. 2020; pp. 1-14.
Asustek; "Missing parts in the beam failure detection and recovery procedure;" 3GPP TSG-RAN WG2 Meeting #101bis; Apr. 2018; pp. 1-9.
Mediatek; "Summary 2 on the Remaing issues on Beam Failure Recovery;" 3GPP TSG RAN WG1 Meeting #92bis; Apr. 2018; pp. 1-23.
Qualcomm Incorporated; "Discussion on BFR in multi-TRP operation;" 3GPP TSG-RAN WG2 Meeting #107; Aug. 2019; pp. 1-5.
Chinese language office action dated Dec. 28, 2021, issued in application No. TW 110126581.
Extended European Search Report dated Jan. 5, 2022, issued in application No. EP 21189644.4.

* cited by examiner

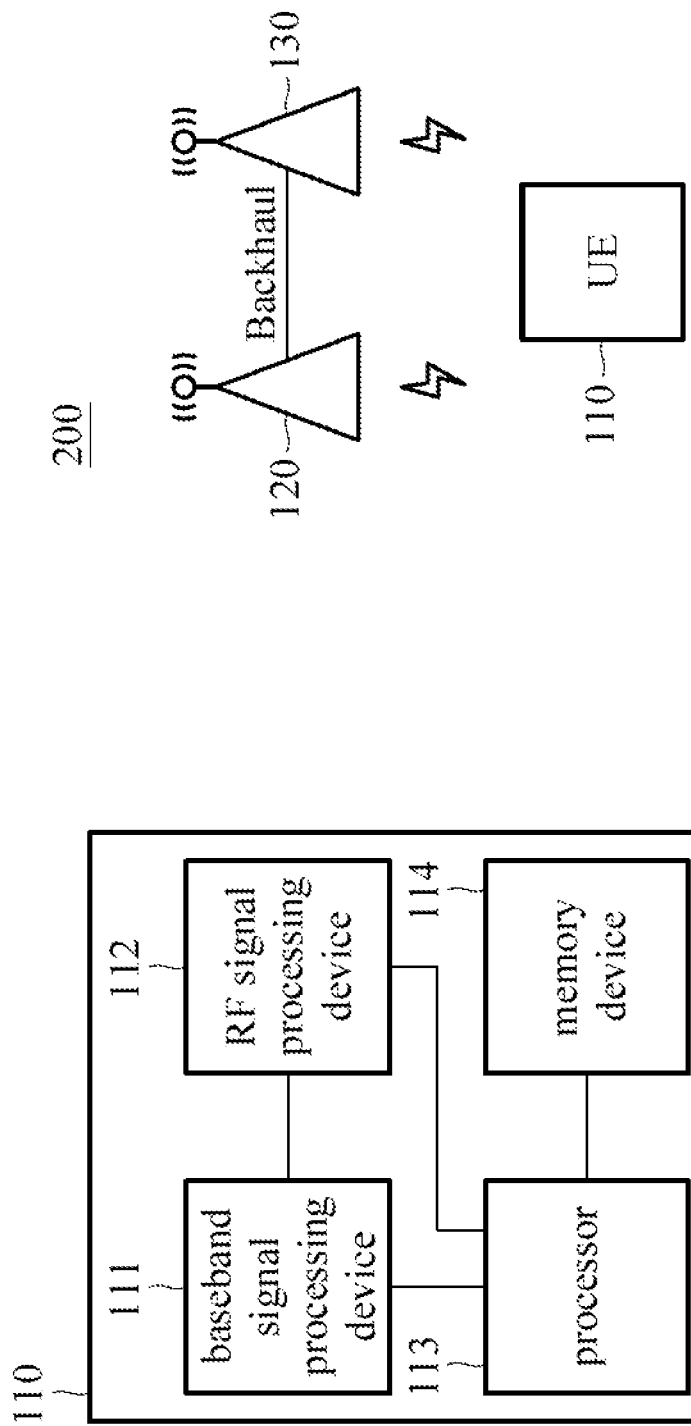

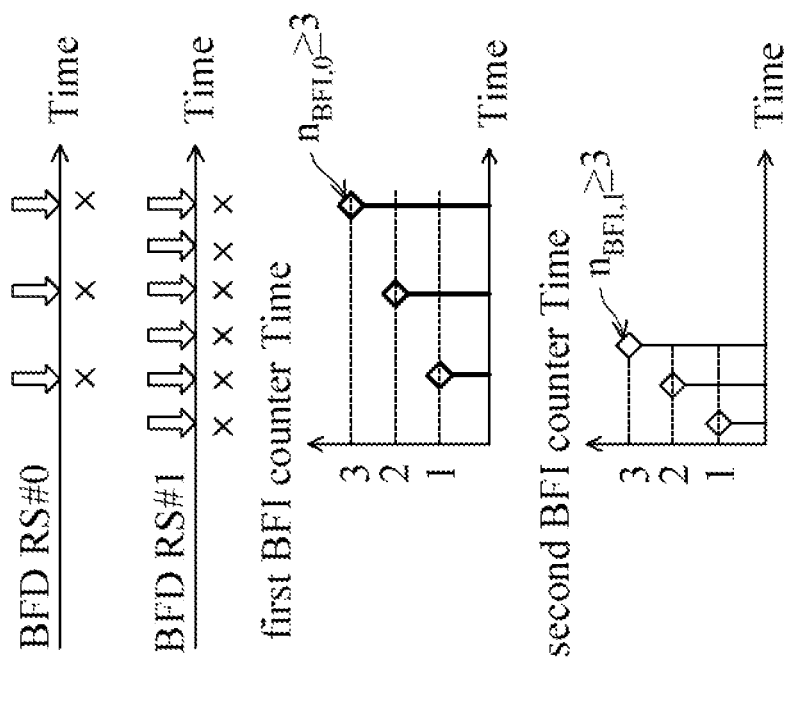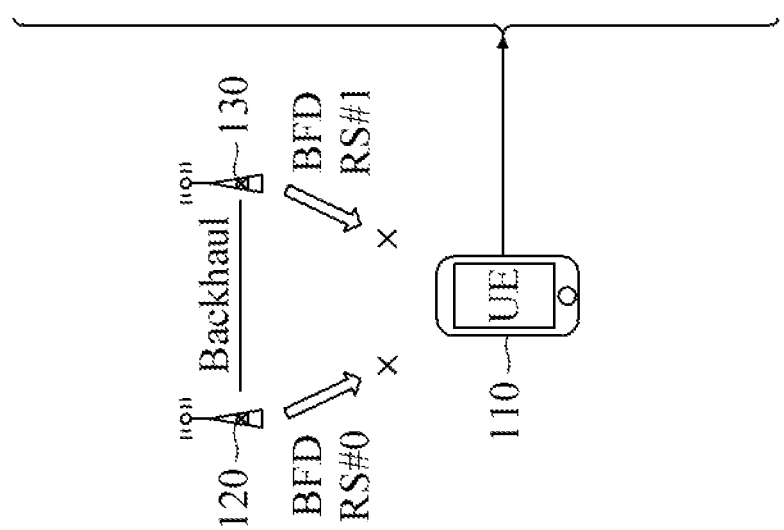
FIG. 7

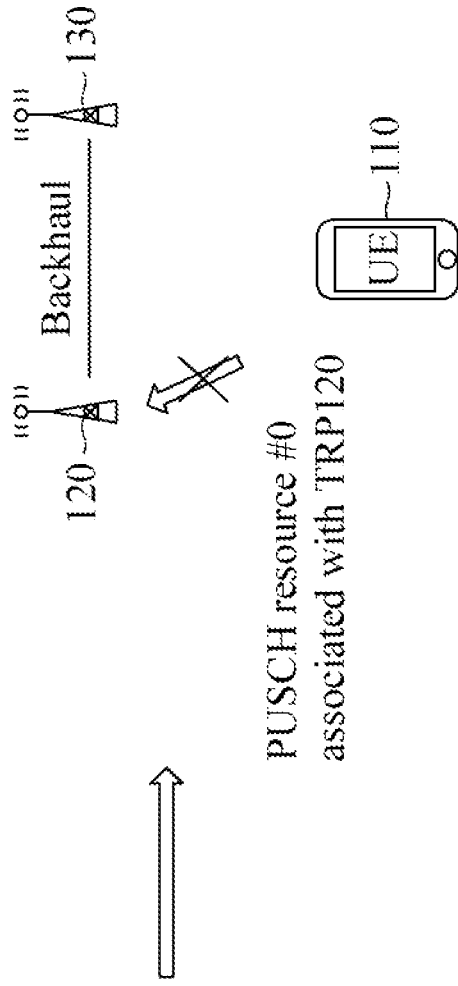
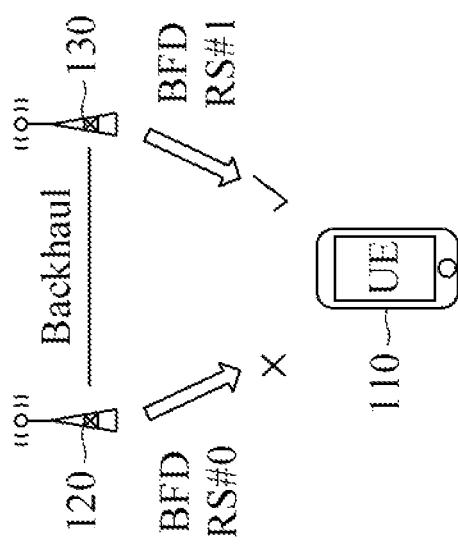
FIG. 14B

USER EQUIPMENT FOR BEAM FAILURE DETECTION AND BEAM FAILURE DETECTION METHOD

CROSS REFERENCE TO RELATED APPLICATIONS

This application claims priority of Provisional Patent Application No. 63/061,197, filed on Aug. 5, 2020, the entirety of which is incorporated by reference herein.

BACKGROUND OF THE INVENTION

Field of the Invention

The invention relates to beam failure detection (BFD) technology, and more particularly to BFD technology for multi-transmission/reception point (TRP) operation.

Description of the Related Art

Under current 3rd-Generation Partnership Project (3GPP) specification for New Radio (NR) mobile communications, user equipment (UE) can select another beam from a list of candidate beams when a serving beam is not available. This operation may involve beam failure detection and beam failure recovery (BFR).

However, when the BFR procedure is applied on a multi-transmission/reception point (multi-TRP) operation, the BFR procedure cannot be triggered if the control beams of one TRP are failure. That is to say, only when all control beams of all TRPs are failure, the BFR procedure is triggered on the multi-TRP operation. Therefore, the UE may miss the detection of the downlink control information (DCI) from the disconnected TRP. In addition, the UE may need to turn on an antenna panel for receiving the signal from the disconnected TRP, wasting power as a result.

BRIEF SUMMARY OF THE INVENTION

User equipment (UE) for beam failure detection (BFD) and a BFD method are provided to overcome the problems mentioned above.

An embodiment of the invention provides user equipment (UE) for beam failure detection (BFD). The UE comprises a radio frequency (RF) signal processing device and a processor. The RF signal processing device assesses a first radio link quality according to a first BFD-reference signal (BFD-RS) set comprising at least one reference signal. The processor is coupled to the RF signal processing device. When the first radio link quality is below a threshold, the processor generates a first indication, wherein the first indication is a first beam failure instance (BFI) or the first BFD-RS set. The processor enables a first timer and a first counter according to the first indication.

In some embodiments of the invention, in the BFD method, the first BFD-RS set is configured by network, wherein the first BFD-RS set is associated with a first group index or a first group identity.

In some embodiments of the invention, the processor determines the first BFD-RS set, wherein the at least one reference signal in the first BFD-RS set is associated with a first group index or a first group identity. In the embodiments, the at least one reference signal and a respective CORESET of the at least one reference signal are associated with a value of RS index indicated by a TCI-State.

In some embodiments of the invention, the first indication with a periodicity determined by the maximum between the shortest periodicity of the at least one reference signal and a fixed value.

In some embodiments of the invention, when a second radio link quality of a second reference signal is below the threshold, the processor generates a second indication, and enables a second timer and the first counter, wherein the second indication is a second beam failure instance (BFI) or a second BFD-RS set. In the embodiments, the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the first counter to generate a second calculation result, and when the second calculation result is above or equal to a second threshold, the processor determines that a beam failure occurs associated with the second BFD-RS set, wherein the first calculation is a floor calculation and the second calculation is a module calculation.

In some embodiments of the invention, when a second radio link quality of a second reference signal is below the threshold, the processor generates a second indication, and enables the first timer and the first counter, wherein the second indication is a second beam failure instance (BFI) or a second BFD-RS set. In the embodiments, when the first indication is generated, the processor updates the first timer through a third calculation and when a second indication is generated, the processor updates the first timer through a fourth calculation, wherein the third calculation is associated with a module calculation and the fourth calculation is associated with a floor calculation, and wherein the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the first counter to generate a second calculation result, wherein when the second calculation result is above or equal to a second threshold, the processor determines that a beam failure occurs is associated with the second BFD-RS set, wherein the first calculation is the floor calculation and the second calculation is the module calculation. In some embodiments, the first timer and the second timer may be configured in a lower layer.

In some embodiments of the invention, when a second radio link quality is below the threshold, the processor generates a second indication, and enables a second timer and a second counter, wherein the second indication is a second beam failure instance (BFI) or a second BFD-RS set. In the embodiments, the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the second counter to generate a second calculation result, wherein when the second calculation result is above or equal to a second threshold, the processor determines that a beam failure occurs associated with the second BFD-RS set, wherein the first calculation is for calculating the number of first indications and the second calculation is for calculating the number of second indications.

In some embodiments of the invention, the RF signal processing device transmits a first scheduling request for a beam failure recovery (BFR), wherein the first scheduling request is associated with the first BFD-RS set. In one embodiment, the RF signal processing device transmits a first physical uplink control channel (PUCCH) resource corresponding to the first scheduling request, when a beam failure associated with a second BFD-RS set occurs. In another embodiment, the RF signal processing device transmits a first PUCCH resource corresponding to the first scheduling request, when a beam failure associated with the first BFD-RS set occurs.

In some embodiments of the invention, the BFD method may further comprises that the processor determines whether to transmit a physical uplink shared channel (PUSCH) resource for accommodating a medium-access-channel control-element (MAC CE) for reporting information related to a BFR. In the embodiments, if an available PUSCH resource for a new transmission associated with the first BFD-RS set which has not been declared a beam failure, the processor determines to transmit the PUSCH resource for accommodating the MAC CE for reporting information related to the BFR, and if an available PUSCH resource for a new transmission associated with a second BFD-RS set which has been declared a beam failure, the processor determines not to transmit the PUSCH resource for accommodating the MAC CE for reporting information related to the BFR.

In some embodiments of the invention, the processor assumes that at least one demodulation reference signal (DM-RS) port of PDSCH is associated with a BFD-RS set which has not been declared a beam failure.

An embodiment of the invention also provides a beam failure detection (BFD) method. The BFD method is applied to user equipment (UE), wherein the UE communicates with a plurality of transmission/reception points (TRPs) which comprise at least a first TRP and a second TRP. The BFD method comprises the following steps of determining, whether the first quality of a first reference signal or a second quality of a second reference signal is below a threshold, wherein the first reference signal is associated with the first TRP and the second signal is associated with the second TRP; when the first quality is below the threshold, generating a first beam failure instance (BFI) indication, and enabling a first timer and a first counter; performing a first calculation for a first value of the first counter to generate a first calculation result; and when the first calculation result is above or equal to a first threshold, determining, by the processor, a beam failure occurs in the first TRP.

Other aspects and features of the invention will become apparent to those with ordinary skill in the art upon review of the following descriptions of specific embodiments of the UE for BFD and the BFD method.

BRIEF DESCRIPTION OF THE DRAWINGS

The invention will become more fully understood by referring to the following detailed description with reference to the accompanying drawings, wherein:

FIG. 1 is a block diagram of user equipment (UE) 110 according to an embodiment of the invention.

FIG. 2 is a schematic diagram of wireless communication system 200 according to an embodiment of the invention.

FIG. 7 is a schematic diagram of beam failure for the TRP 120 and TRP 130 according to the third embodiment for the BFD procedure of the invention.

FIG. 14B is a schematic diagram of determining the PUSCH resource according to another embodiment of the invention.

DETAILED DESCRIPTION OF THE INVENTION

Figure 3:
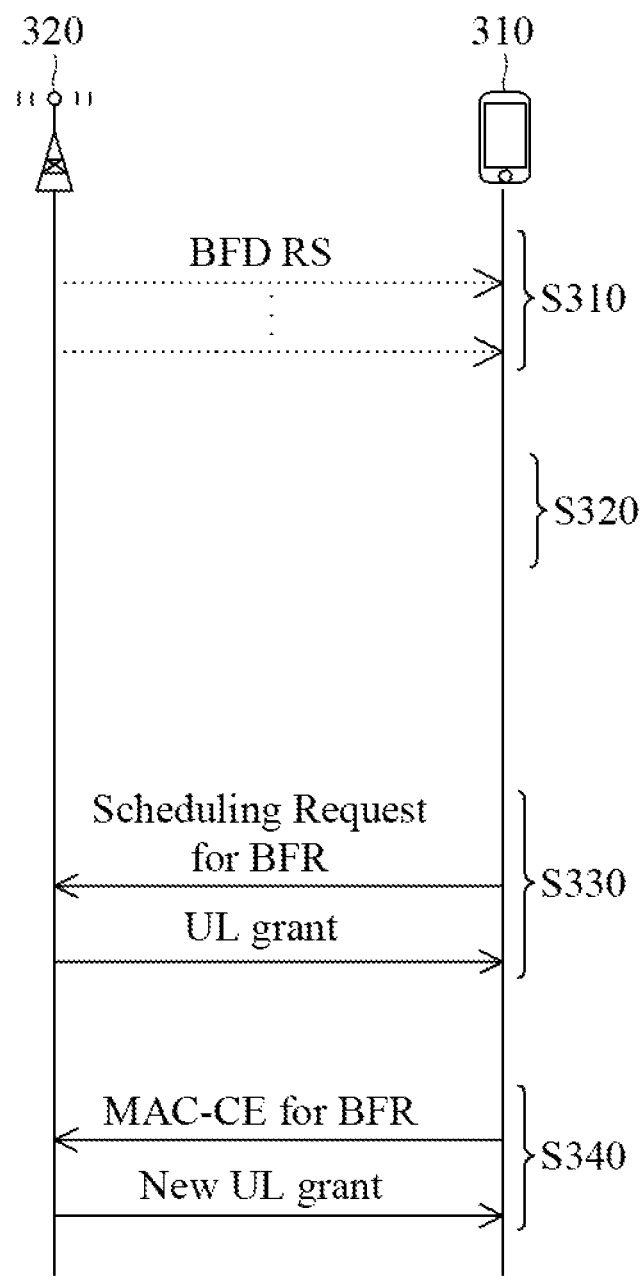
FIG. 3 is a schematic diagram of a beam failure recovery (BFR) procedure according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

In the embodiments of the invention, a beam-failure-detection reference-signal (BFD-RS) in the invention may be a Channel state information-reference signal (CSI-RS), a synchronization signal block (SSB), a demodulation reference signal (DMRS) or a sound reference signal (SRS), but the invention should not be limited thereto.

In the embodiments of the invention, an index or an identity in the invention may be a CORESETPoolIndex, a TRP_ID, a candidate beam RS List ID, Panel ID, group/set ID, group/set index, but the invention should not be limited thereto.

In the embodiments of the invention, the UE may be configured with at least one of following information for multiple multi-transmission/reception point (TRP) operation, the information may comprise a set of CORESETPoolIndexes, a set of TRPs, a set of candidate beam RS Lists, and a set of panels, but the invention should not be limited thereto.

In the embodiments of the invention, the base station in the invention may be a next Generation Node B (gNodeB), a cell, a serving cell, a TRP, a panel, an unlicensed cell, an unlicensed serving cell, an unlicensed TRP, an evolved NodeB (eNodeB), but the invention should not be limited thereto.

In the embodiments of the invention, the UE declares that the beam failure in a TRP means that the UE may trigger a beam failure recovery (BFR) procedure associated with the TRP, or the UE may initiate a random process BFR associated with the TRP, but the invention should not be limited thereto.

FIG. 1 is a block diagram of user equipment (UE) 110 according to an embodiment of the invention. As shown in FIG. 1, the UE 110 may comprise at least a baseband signal processing device 111, a radio frequency (RF) signal processing device 112, a processor 113, a memory device 114, and an antenna module comprising at least one antenna. It should be noted that in order to clarify the concept of the invention, FIG. 1 presents a simplified block diagram in which only the elements relevant to the invention are shown. However, the invention should not be limited to what is shown in FIG. 1.

In the embodiments of the invention, the UE 110 may be a smartphone, Personal Data Assistant (PDA), pager, laptop computer, desktop computer, wireless handset, or any computing device that includes a wireless communications interface.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, analog-to-digital converter (ADC)/digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s).

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 1.

FIG. 2 is a schematic diagram of wireless communication system 200 according to an embodiment of the invention. The wireless communication system 200 may be applied to multi-transmission/reception point (TRP) operation. As shown in FIG. 2, the wireless communication system 200 may comprise the UE 110, a first transmission/reception point (TRP) 120 and a second TRP 130. The TRR 120 and the TRP 130 may be communicates with a backhaul connection. It should be noted that in order to clarify the concept of the invention, FIG. 2 presents a simplified block diagram. However, the invention should not be limited to what is shown in FIG. 2. There are more TRPs in the wireless communication system 200 for the multi-TRP operation. Furthermore, the TRP 120 and TRP 130 are used to illustrate the beam failure recovery (BFR) procedure (e.g. the beam failure detection operations and the beam failure reporting operations) discussed in the embodiments of the invention below, but the invention should not be limited thereto. The BFR procedure discussed in the embodiments of the invention also can be applied to more TRPs.

FIG. 3 is a schematic diagram of a BFR procedure according to an embodiment of the invention. The UE 310 may be regarded as the UE 110 and the TRP 320 may be regarded as the TRP 120 and TRP 130. As shown in FIG. 3, in step S310, the TRP 320 may periodically transmit or configure the beam-failure-detection reference-signals (BFD-RS) to the UE 310 for beam failure detection.

In an embodiment of the invention, the base station (e.g. TRP 120 and TRP 130) may configure a higher layer parameter (e.g. failureDetectionResources) to the UE 110. A set of periodic Channel state information-reference signal (CSI-RS) resource (i.e. BFD-RS) configuration indexes may be configured in the higher layer parameter (e.g. failureDetectionResources) for each Bandwidth Part (BWP) of a serving cell, wherein each CSI-RS resource (i.e. BFD-RS) may be associated with an index or an identity (e.g. CORESETPoolIndex, TRP_ID, group/set ID, or group/set index, but the invention should not be limited thereto). According to the index or identity of the BFD-RS, the UE 110 can know the BFD-RS is associated which TRP. For example, the BFD-RS #0 and the BFD-RS #2 configured by the TRP 120 may be associated a TRP_ID TRP #0 corresponding to the TRP 120 and the BFD-RS #1 and the BFD-RS #3 configured by the TRP 130 may be associated another TRP_ID TRP #1 corresponding to the TRP 130. In the embodiment of the invention, the UE 110 may be configured up to 2 BFD-RS sets per BWP, and up to N resources per BFD-RS set, wherein the N may be {1,2}. Different BFD-RS set may be corresponded to different TRPs or different CORESETpoolindexes.

In another embodiment, if the base station (e.g. TRP 120 and TRP 130) may not configure a set of BFD-RSs through a higher layer parameter (e.g. failureDetectionResources or beamFailureDetectionResourcesList) to the UE 110 for a BWP of the serving cell, the UE 110 may determine at least one BFD-RS set according to the configured Control Resource Set (CORESET) information. The UE 110 may classify the received BFD-RSs into different BFD-RS set according to the configured CORESET information. The CORESET information may be configured with a CORESETPoolIndex and/or a Transmission Configuration Indicator-state (TCI-state). The CORESETPoolIndex may indicate that its corresponding CORESET is belonged to which TRP. The TCI-state may indicate that the RS index in the RS set for respective CORESETs. For example, if the CORESET #0 is configured with a CORESETPoolIndex #0 and/or TCI-state #0 and the RS #$A_0$ is indicated by the TCI-state #0 for spatial Rx parameter of a quasi co-located (QCL) type and the CORESET #1 is configured with a CORESETPoolIndex #1 and/or TCI-state #1 and the RS #$A_1$ is indicated by the TCI-state #1 for spatial Rx parameter of a quasi co-located (QCL) type, the UE 110 may know that the RS #$A_0$ is associated with the CORESET #0 and the RS #$A_1$ is associated with the CORESET #1. Therefore, the UE 110 may determine at least one BFD-RS set according to the associations. In the embodiment, each of the BFD-RS indexes with the same values as the RS indexes in the RS set indicated by TCI-state for respective CORESETs may be configured with the same index or identity (e.g. CORESETPoolIndex, TRP_ID, group/set ID, or group/set index, but the invention should not be limited thereto). For example, the UE 110 may determine the BFD-RS set #0 for BFD of the TRP 120, wherein each RS in the BFD-RS set #0 has the same spatial information with a RS configured in a TCI state associated with a CORSET corresponding to the CORESETPoolIndex #0 (or TRP #0). In other words, if the UE 110 is not provided a set $q_0$ (e.g. a set of BFD-RSs) by failureDetectionResources or beamFailureDetectionResourceList for a BWP of the serving cell, the UE 110 may determine the set $q_0$ to include periodic CSI-RS resource configuration indexes with same values as the RS indexes in the RS sets indicated by TCI-State for respective CORESETs that the UE uses for monitoring PDCCH wherein, if there are two RS indexes in a TCI state, the set includes RS indexes with QCL-TypeD configuration for the corresponding TCI states. In addition, the UE 110 may determine each CSI-RS resource configuration indexes is associated with an index or an identity (e.g. CORESETPoolIndex, TRP ID, group/set ID, or group/set index, but the invention should not be limited thereto), wherein the each BFD-RS indexes with same values as the RS indexes in the RS sets indicated by TCI-State for respective CORESETs may be configured with the same index or the identity (e.g., CORESETPoolIndex, TRP ID, group/set ID, or group/set index, but the invention should not be limited thereto), and wherein the UE 110 uses the CORESETs for monitoring PDCCH.

In another embodiment of the invention, the base station (e.g. TRP 120 and TRP 130) may configure a higher layer parameter (e.g. failureDetectionResources) to the UE 110. A set of periodic CSI-RS resource (i.e. BFD-RS) configuration indexes may be configured in the higher layer parameter (e.g. failureDetectionResources). However, in the embodiment, in the higher layer parameter (e.g. failureDetectionResources), each CSI-RS resource (i.e. BFD-RS) may not be associated with an index or an identity (e.g. CORESETPoolIndex, TRP_ID, group/set ID, or group/set index, but the invention should not be limited thereto). Therefore, in the embodiment, the UE 110 may determine each CSI-RS resource (i.e. BFD-RS) configuration index is associated with an index or an identity (e.g. CORESETPoolIndex, TRP_ID, group/set ID, or group/set index, but the invention should not be limited thereto), wherein each of the BFD-RS indexes with the same values as the RS indexes in the RS sets indicated by TCI-state associated with a CORESET may be configured with the same index or identity (e.g. CORESETPoolIndex, TRP_ID, group/set ID, or group/set index, but the invention should not be limited thereto). In other words, the UE 110 may be provided, for each BWP of a serving cell, a set $q_0$ (e.g. a set of BFD-RSs) of periodic CSI-RS resource configuration indexes by failureDetectionResources. If the UE 110 is configured by a higher layer parameter PDCCH-Config that contains at least one value of CORESETPoolIndex in ControlResourceSet and/or if each CSI-RS resource is not associated with an index or an identity (e.g. CORESETPoolIndex, TRP ID, group/set ID, or group/set index, but the invention should not be limited thereto), the UE 110 may determine each CSI-RS resource configuration indexes is associated with an index or an identity (e.g. CORESETPoolIndex, TRP ID, group/set ID, or group/set index, but the invention should not be limited thereto), wherein each BFD-RS indexes with same values as the RS indexes in the RS sets indicated by TCI-State for respective CORESETs may be configured with the same index or the identity (e.g. CORESETPoolIndex, TRP ID, group/set ID, or group/set index, but the invention should not be limited thereto, and wherein the UE 110 uses the CORESETs for monitoring PDCCH.

In another embodiment of the invention, the base station (e.g. TRP 120 and TRP 130) may configure a higher layer parameter (e.g. failureDetectionResources) to the UE 110. An index or an identity (e.g. CORESETPoolIndex, TRP_ID, group/set ID, or group/set index, but the invention should not be limited thereto) may be configured in the higher layer parameter (e.g. failureDetectionResources), wherein each index or an identity may associated with at least one BFD-RS. For example, if the BFD-RS #0 and the BFD-RS #2 are configured by the TRP 120 corresponding to the TRP_ID TRP #0 and the BFD-RS #1 and the BFD-RS #3 are configured by the TRP 130 corresponding to the TRP_ID TRP #1, the BFD-RS #0 and the BFD-RS #2 may be configured to a set associated with a TRP_ID TRP #0, and the BFD-RS #1 and the BFD-RS #3 may be configured to another set associated another TRP_ID TRP #1. In the embodiment of the invention, the UE 110 may be configured up to 2 BFD-RS sets per BWP, and up to N resources per BFD-RS set, wherein the N may be {1,2}. Different BFD-RS set may be corresponded to different TRPs or different CORESETpoolindexes.

Figure 4:
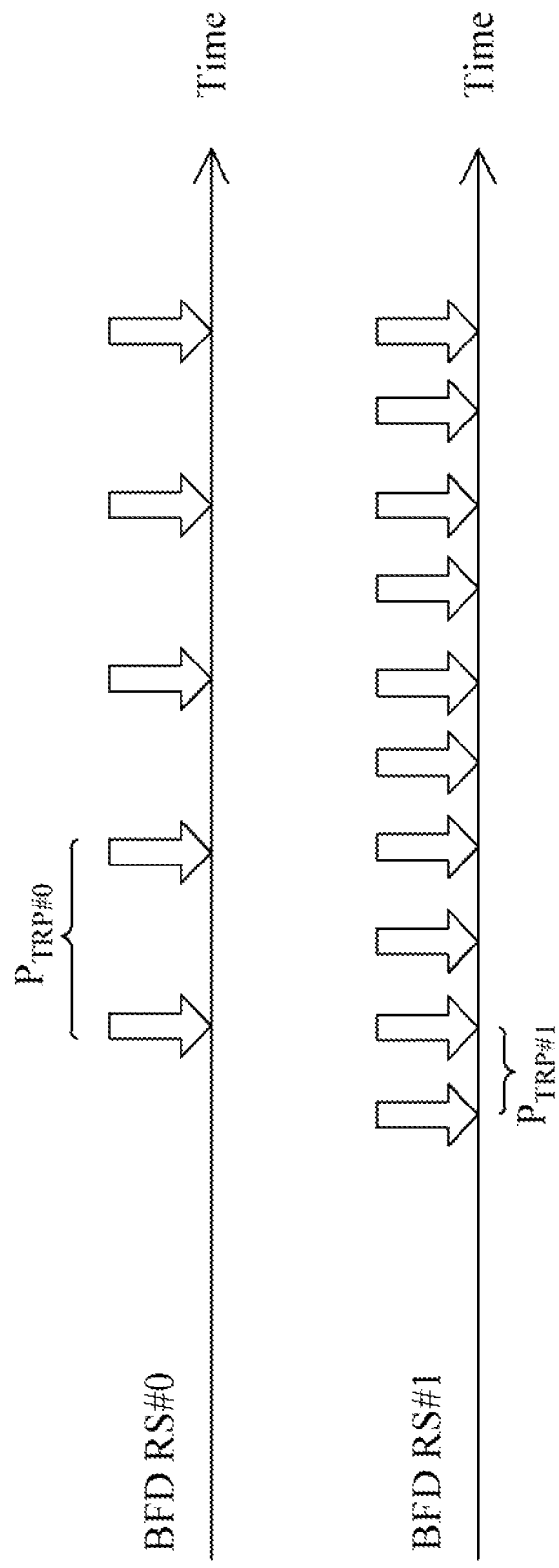
FIG. 4 is a schematic diagram of the first reporting period $P_{TRP\#0}$ and the second reporting period $P_{TRP\#1}$ according to an embodiment of the invention.

In the embodiments of the invention, the physical layer in the UE 110 may assess the radio link quality per BFD-RS set. The UE 110 may monitor the BFD-RS periodically. When the radio link quality of periodic BFD-RS is worse than a threshold, a beam failure instance (BFI) (or BFI indication) will be detected in the lower layer (e.g. physical layer) of the UE 110 and the UE 110 may send the BFI indication to the higher layer (e.g. MAC layer) of the UE 110. In another embodiment, the BFI may be an BFD-RS set. Different BFI indications may be corresponded to different TRPs (e.g. TRP 120 and TRP 130) or different CORESETpoolindexes. In an embodiment of the invention, for the TRP 120, a first reporting period $P_{TRP\ \#0}$ of a first BFI indication $BFI_{TRP\ \#0}$ from a lower layer (e.g. the physical layer) of the UE 110 to a higher layer (e.g. MAC layer) of the UE 110 may be associated with a first set of BFD-RS (e.g. BFD-RS #0) which correspond to a first CORESET-PoolIndex or TRP_ID (e.g. TRP #0). The first reporting period $P_{TRP\ \#0}$ may be defined as follows:

$$P_{TRP\ \#0} = \text{Max}\{P_0, T_0\ ms\},$$

wherein $P_0$ may be defined as min [periodicity of configured BFD-RS(s) associated with the TRP 120] and $T_0$ may be a fixed and configured time duration. In addition, for the TRP 130, a second reporting period $P_{TRP\ \#1}$ of a second BFI indication $BFI_{TRP\ \#1}$ from a lower layer (e.g. the physical layer) of the UE 110 to a higher layer (e.g. MAC layer) of the UE 110 may be associated with a second set of BFD-RS (e.g. BFD-RS #1) which correspond to a second CORE-SETPoolIndex or TRP_ID (e.g. TRP #1). The second reporting period $P_{TRP\ \#1}$ may be defined as follows:

$$P_{TRP\ \#1} = \text{Max}\{P_1, T_1\ ms\},$$

wherein $P_1$ may be min [periodicity of configured BFD-RS(s) associated with the TRP 130] and $T_1$ may be a fixed and configured time. FIG. 4 is a schematic diagram of the first reporting period $P_{TRP\ \#0}$ and the second reporting period $P_{TRP\ \#1}$ according to an embodiment of the invention.

According to a first embodiment for the BFD procedure of the invention, the separate BFD timer for the TRP 120 and TRP 130 may be configured in the UE 110. The UE 110 may start or restart a first BFD timer $T_{TRP,0}$ upon receiving the corresponding first BFI indication $BFI_{TRP\ \#0}$ from a lower layer (e.g. the physical layer) to the higher layer (e.g. MAC layer). The first BFD timer $T_{TRP,0}$ may be defined as follows:

$$T_{TRP,0} = N_{TRP\ \#0} * P_{TRP\ \#0},$$

wherein the $N_{TRP\ \#0}$ may be an integer. The UE 110 may start or restart a second BFD timer $T_{TRP,1}$ upon receiving the corresponding second BFI indication $BFI_{TRP\ \#1}$ from a lower layer (e.g. the physical layer) to the higher layer (e.g. MAC layer). The second BFD timer $T_{TRP,1}$ may be defined as follows:

$$T_{TRP,1} = N_{TRP\ \#1} * P_{TRP\ \#1},$$

wherein the $N_{TRP\ \#1}$ may be an integer.

Furthermore, in the first embodiment of the invention, the UE 110 may determine a BFI counter according to the number of reported first BFI indication $BFI_{TRP\ \#0}$ and the number of reported second BFI indication $BFI_{TRP\ \#1}$. The BFI counter in the first embodiment may be defined as follows:

$$BFI\ \text{counter} = n_{BFI,0} * K + n_{BFI,1},$$

wherein the $n_{BFI,0}$ is the number of reported first BFI indication $BFI_{TRP\ \#0}$, the $n_{BFI,1}$ is the number of reported second BFI indication $BFI_{TRP\ \#1}$, and K is a predefined or preconfigured value of counter step. The UE 110 may declare a beam failure occurs in the TRP 120, if the following condition is satisfied:

$$\text{Floor}(BFI\ \text{counter}/K) \geq C_{max,\ TRP0},$$

wherein the $C_{max,\ TRP0}$ is a first threshold for triggering beam failure recovery associated with the TRP 120. The first threshold $C_{max,\ TRP0}$ may be configured by the base station (e.g. the TRP 120). UE 110 may declare that a beam failure occurs in the TRP 130, if the following condition is satisfied:

$$\text{Mod}(BFI\ \text{counter}, K) \geq C_{max,\ TRP1},$$

wherein the $C_{max,\ TRP1}$ is a second threshold for triggering beam failure recovery associated with the TRP 130 and K is above $C_{max,\ TRP1}$. The second threshold $C_{max,\ TRP1}$ may be configured by the base station (e.g. the TRP 130). The UE 110 may declare both of the TRP 120 and the TRP 130 are beam failure, if the following condition is satisfied:

$$\text{Floor}(BFI\ \text{counter}/K) * K + \text{Mod}(BFI\ \text{counter}, K) \geq C_{max},$$

wherein the $C_{max}$ is a third threshold for triggering beam failure recovery associated with the TRP 120 and the TRP 130. The third threshold $C_{max}$ may be configured by the base station (e.g. the TRP 120 and/or the TRP 130).

Figure 5A:
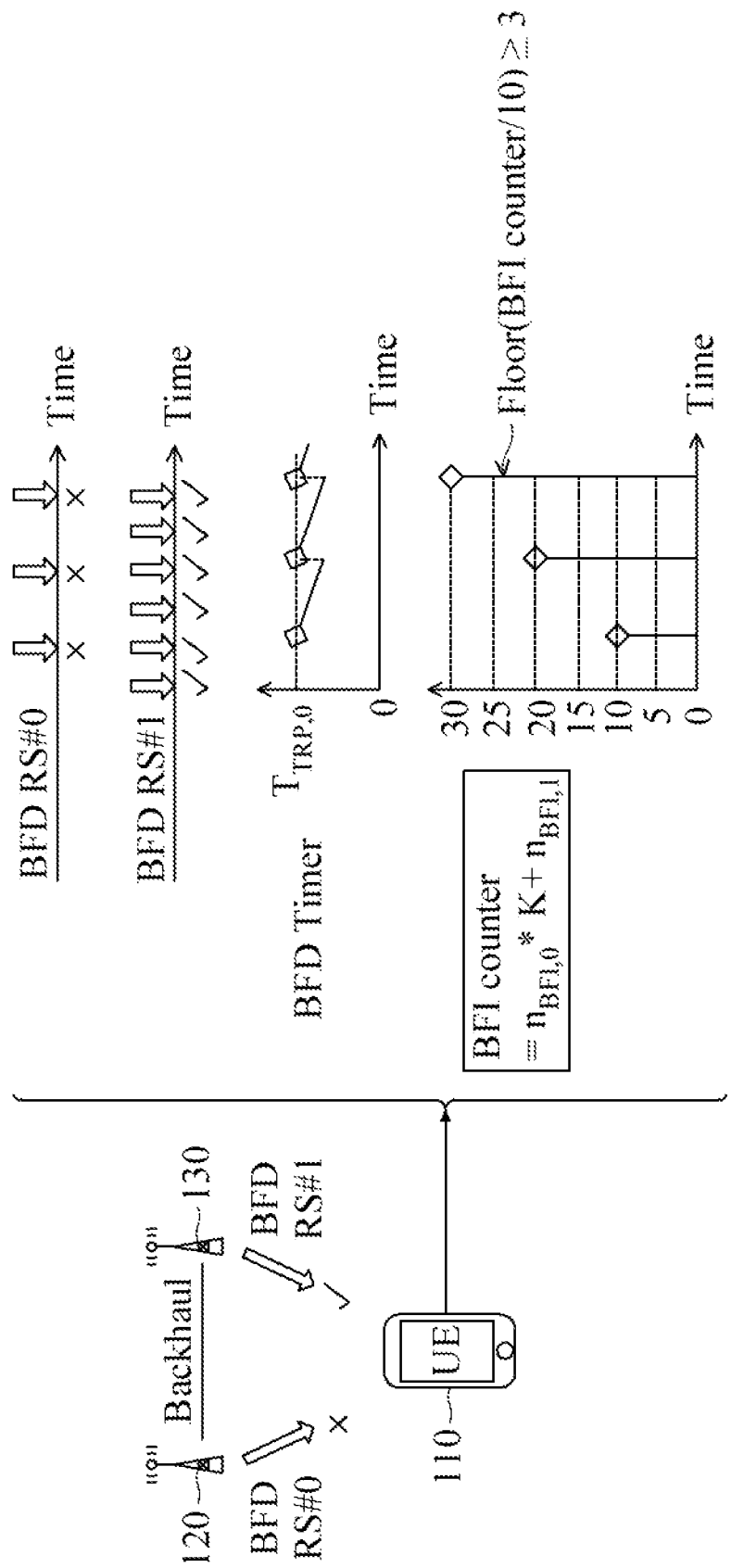
FIG. 5A is a schematic diagram of declaring a beam failure occurs in the TRP 120 according to the first embodiment for the BFD procedure of the invention.

FIG. 5A is a schematic diagram of declaring that a beam failure occurs in the TRP 120 according to the first embodiment for the BFD procedure of the invention. It is assumed that counter factor K=10 and the first threshold $C_{max,\ TRP0}$=3 in FIG. 5A. In FIG. 5A, the symbol "x" means that the radio link quality of the BFD-RS is worse than a threshold (i.e. a BFI indication will be detected) and the symbol "✓" means that the radio link quality of the BFD-RS is better than the threshold (i.e. a beam failure instance indication will not be detected). As shown in FIG. 5A, when the radio link quality of the BFD-RS #0 is worse than a threshold at a first monitoring time point for the first reporting period $P_{TRP\ \#0}$, the first BFI indication $BFI_{TRP\ \#0}$ will be detected in the lower layer (e.g. physical layer) of the UE 110 and the UE 110 may send the first BFI indication $BFI_{TRP\ \#0}$ to the higher layer (e.g. MAC layer) of the UE 110. When the higher layer (e.g. MAC layer) receives the first BFI indication $BFI_{TRP\ \#0}$, the UE 110 will start the first BFD timer $T_{TRP,0}$ and increase the current value of the BFI counter by 10 (i.e. BFI counter=1*10+0). When the first BFD timer $T_{TRP,0}$ is enabled, the value of the first BFD timer $T_{TRP,0}$ will gradually return to 0. When the radio link quality of the BFD-RS #0 is worse than a threshold at a second monitoring time point for the first reporting period $P_{TRP\ \#0}$, the first BFI indication $BFI_{TRP\ \#0}$ will be detected in the lower layer (e.g. physical layer) of the UE 110 again and the UE 110 may send the first BFI indication $BFI_{TRP\ \#0}$ to the higher layer (e.g. MAC layer) of the UE 110. When the higher layer (e.g. MAC layer) receives the first BFI indication $BFI_{TRP\ \#0}$, the UE 110 will restart the first BFD timer $T_{TRP,0}$ and increase the current value of the BFI counter by 10 (i.e. BFI counter=2*10+0). When the radio link quality of the BFD-RS #0 is worse than a threshold at a third monitoring time point for the first reporting period $P_{TRP\ \#0}$, the first BFI indication $BFI_{TRP\ \#0}$ will be detected in the lower layer (e.g. physical layer) of the UE 110 again and the UE 110 may send the first BFI indication $BFI_{TRP\ \#0}$ to the higher layer (e.g. MAC layer) of the UE 110. When the higher layer (e.g. MAC layer) receives the first BFI indication $BFI_{TRP\ \#0}$, the UE 110 will restart the first BFD timer $T_{TRP,0}$ and increase the current value of the BFI counter by 10 (i.e. BFI counter=3*10+0). Because the BFI counter=30 has satisfied the condition: Floor(BFI counter/K)≥$C_{max,\ TRP0}$, the UE 110 will declare that a beam failure occurs in the TRP 120, i.e. a new candidate beam needs to be found for the TRP 120.

Figure 5B:
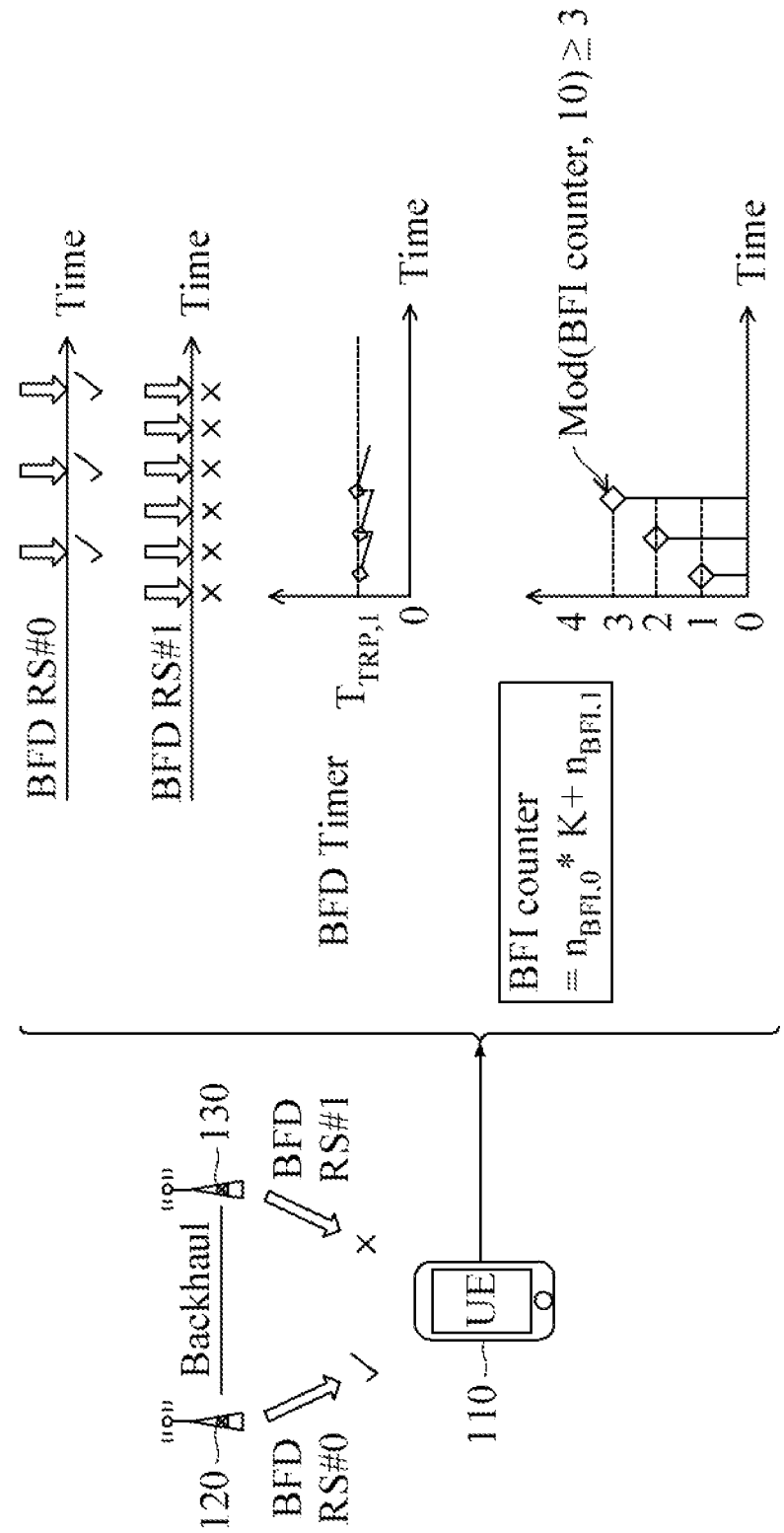
FIG. 5B is a schematic diagram of declaring a beam failure occurs in the TRP 130 according to the first embodiment for the BFD procedure of the invention.

FIG. 5B is a schematic diagram of declaring that a beam failure occurs in the TRP 130 according to the first embodiment for the BFD procedure of the invention. It is assumed that counter factor K=10 and the second threshold $C_{max,\ TRP1}$=3 in FIG. 5B. In FIG. 5B, the symbol "x" means that the radio link quality of the BFD-RS is worse than a threshold (i.e. a BFI indication will be detected) and the symbol "✓" means that the radio link quality of the BFD-RS is better than the threshold (i.e. a beam failure instance indication will not be detected). As shown in FIG. 5B, when the radio link quality of the BFD-RS #1 is worse than a threshold at a first monitoring time point for the second reporting period $P_{TRP\ \#1}$, the second BFI indication $BFI_{TRP\ \#1}$ will be detected in the lower layer (e.g. physical layer) of the UE 110 and the UE 110 may send the second BFI indication $BFI_{TRP\ \#1}$ to the higher layer (e.g. MAC layer) of the UE 110. When the higher layer (e.g. MAC layer) receives the second BFI indication $BFI_{TRP\ \#1}$, the UE 110 will start the second BFD timer $T_{TRP,1}$ and increase the current value of the BFI counter by 1 (i.e. BFI counter=0*10+1). When the second BFD timer $T_{TRP,1}$ is enabled, the value of the second BFD timer $T_{TRP,1}$ will gradually return to 0. When the radio link quality of the BFD-RS #1 is worse than the threshold at a second monitoring time point for the second reporting period $P_{TRP\ \#1}$, the second BFI indication $BFI_{TRP\ \#1}$ will be detected in the lower layer (e.g. physical layer) of the UE 110 again and the UE 110 may send the second BFI indication $BFI_{TRP\ \#1}$ to the higher layer (e.g. MAC layer) of the UE 110. When the higher layer (e.g. MAC layer) receives the second BFI indication $BFI_{TRP\ \#1}$, the UE 110 will restart the second BFD timer $T_{TRP,1}$ and increase the current value of the BFI counter by 1 (i.e. BFI counter=0*10+2). When the radio link quality of the BFD-RS #1 is worse than the threshold at a third monitoring time point for the second reporting period $P_{TRP\ \#1}$, the second BFI indication $BFI_{TRP\ \#1}$ will be detected in the lower layer (e.g. physical layer) of the UE 110 again and the UE 110 may send the second BFI indication $BFI_{TRP\ \#1}$ to the higher layer (e.g. MAC layer) of the UE 110. When the higher layer (e.g. MAC layer) receives the second BFI indication $BFI_{TRP\ \#1}$, the UE 110 will restart the second BFD timer $T_{TRP,1}$ and increase the current value of the BFI counter by 1 (i.e. BFI counter=0*10+3). Because the BFI counter=3 has satisfied the condition: Mod(BFI counter, K)≥$C_{max,\ TRP1}$, the UE 110 will declare that a beam failure occurs in the TRP 130, i.e. a new candidate beam needs to be found for the TRP 130.

Figure 5C:
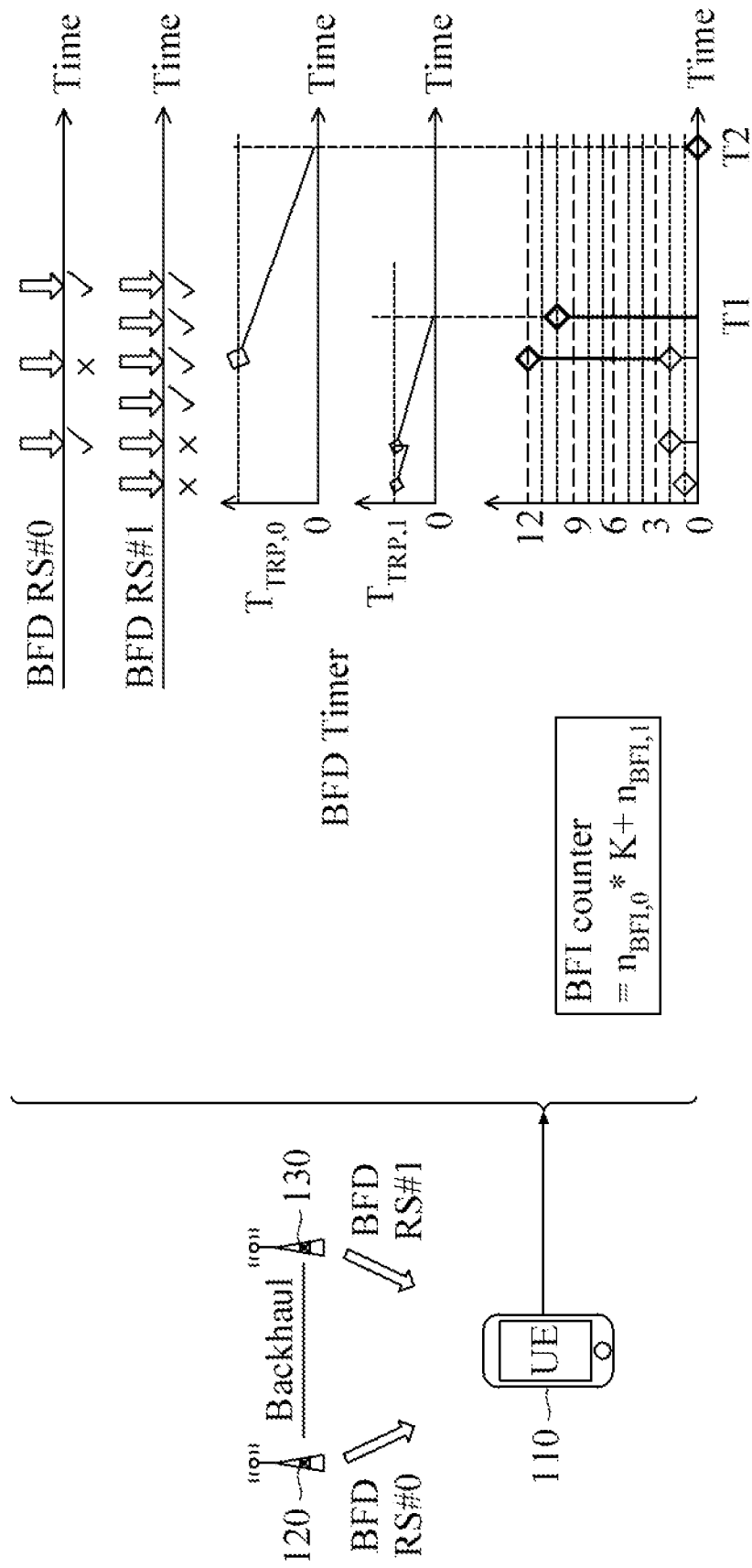
FIG. 5C is a schematic diagram of expirations of the first BFD timer $T_{TRP,0}$ second BFD timer $T_{TRP,0}$ according to the first embodiment for the BFD procedure of the invention.

FIG. 5C is a schematic diagram of expirations of the first BFD timer $T_{TRP,0}$ second BFD timer $T_{TRP,0}$ according to the first embodiment for the BFD procedure of the invention. It is assumed that counter factor K=10 in FIG. 5C. In FIG. 5C, the symbol "x" means that the radio link quality of the BFD-RS is worse than a threshold (i.e. a BFI indication will be detected) and the symbol "✓" means that the radio link quality of the BFD-RS is better than the threshold (i.e. a beam failure instance indication will not be detected). In the first embodiment of the invention, when the second BFD timer $T_{TRP,1}$ expires, the UE 110 may set BFI counter=Floor (BFI counter/K)*K. In addition, when the first BFD timer $T_{TRP,0}$ expires, the UE 110 may set BFI counter=Mod(BFI counter, K). As shown in FIG. 5C, when the higher layer (e.g. MAC layer) receives the second BFI indication $BFI_{TRP\ \#1}$, the UE 110 will start the second BFD timer $T_{TRP,1}$ and increase the current value of the BFI counter by 1 (i.e. BFI counter=0*10+1). When the second BFD timer $T_{TRP,1}$ is enabled, the value of the second BFD timer $T_{TRP,1}$ will gradually return to 0. When the radio link quality of the BFD-RS #1 is worse than the threshold at a second monitoring time point for the second reporting period $P_{TRP\ \#1}$, the second BFI indication $BFI_{TRP\ \#1}$ will be detected in the lower layer (e.g. physical layer) of the UE 110 again and the UE 110 may send the second BFI indication $BFI_{TRP\ \#1}$ to the higher layer (e.g. MAC layer) of the UE 110. When the higher layer (e.g. MAC layer) receives the second BFI indication $BFI_{TRP\ \#1}$, the UE 110 will restart the second BFD timer $T_{TRP,1}$ and increase the current value of the BFI counter by 1 (i.e. BFI counter=0*10+2). Then, when the radio link quality of the BFD-RS #0 is worse than a threshold at a second monitoring time point for the first reporting period $P_{TRP\ \#0}$, the first BFI indication $BFI_{TRP\ \#0}$ will be detected in the lower layer (e.g. physical layer) of the UE 110 and the UE 110 may send the first BFI indication $BFI_{TRP\ \#0}$ to the higher layer (e.g. MAC layer) of the UE 110. When the higher layer (e.g. MAC layer) receives the first BFI indication $BFI_{TRP\ \#0}$, the UE 110 will start the first BFD timer $T_{TRP,0}$ and increase the current value of the BFI counter by 10 (i.e. BFI counter=1*10+2). When the second BFD timer $T_{TRP,1}$ expires at time point T1, the UE 110 may set BFI counter=Floor(BFI counter/K)*K (i.e. the 2-digit value of the BFI counter is changed from 12 to 10 at time point T1). When the first BFD timer $T_{TRP,0}$ expires at time point T2, the UE 110 may set BFI counter=Mod(BFI counter, K) (i.e. the 2-digit value of the BFI counter is changed from 10 to 00 at time point T2).

According to a second embodiment for the BFD procedure of the invention, only one BFD timer is configured in the UE 110. The UE 110 may update (or set, reset, start, restart) the BFD timer upon receiving the first BFI indication $BFI_{TRP\ \#0}$ and/or the second BFI indication $BFI_{TRP\ \#1}$ from a lower layer (e.g. the physical layer) to the higher layer (e.g. MAC layer). When the UE 110 receives the first BFI indication $BFI_{TRP\ \#0}$, the UE 110 may update the BFD timer as follows:

$$BFD\ timer=T'_{TRP,0}*M+\mathrm{Mod}(BFD\ timer, M),$$

wherein the $T'_{TRP,0}$ may be a predefined or configured first time factor for the BFD associated with the TRP 120, and M may be a predefined or configured value of time step factor. In addition, $T'_{TRP,0}$ may be equal to $N_{TRP\ \#0}*P_{TRP\ \#0}$, wherein the $N_{TRP\ \#0}$ may be an integer. When the UE 110 receives the second BFI indication $BFI_{TRP\ \#1}$, the UE 110 may update the BFD timer as follows:

$$BFD\ timer=\mathrm{Floor}(BFD\ timer/M)*M+T'_{TRP,1},$$

wherein the $T'_{TRP,1}$ may be a predefined or configured second time factor for the BFD associated with the TRP 130. In addition, $T'_{TRP,1}$ may be equal to $N_{TRP\ \#1}*P_{TRP\ \#1}$, wherein the $N_{TRP\ \#1}$ may be an integer. For example, it is assumed that the BFD timer has 4-digit value ($x_1x_0y_1y_0$), the first time factor $T'_{TRP,0}$=6, the second time factor $T'_{TRP,1}$=3 and timer step factor M=100. When the UE 110 receives the first BFI indication $BFI_{TRP\ \#0}$, the UE 110 may update the value of the BFD timer from ($x_1x_0y_1y_0$) to ($06y_1y_0$) according to the equation BFD timer=$T'_{TRP\ \#0}*M+\mathrm{Mod}(BFD\ timer, M)$. When the UE 110 receives the second BFI indication $BFI_{TRP\ \#1}$, the UE 110 may update the value of the BFD timer from $(x_1x_0y_1y_0)$ to $(x_1x_003)$ according to the equation BFD timer=Floor(BFD timer/M)*M+$T'_{TRP,1}$.

In the second embodiment of the invention, the UE 110 may determine the BFD timer value according to a first countdown step factor $S_{TRP\ \#0}$ after one first reporting period (or first countdown period) $P_{TRP\ \#0}$. The BFD timer value may be determined according to the following condition:

If [Floor(*BFD* timer/*M*)–$S_{TRP\ \#0}$]>0,

*BFD* timer=[Floor(*BFD* timer/*M*)–$S_{TRP\ \#0}$]*M*+Mod(*BFD* timer,*M*), else

*BFD* timer=Mod(*BFD* timer,*M*), wherein the first countdown step factor $S_{TRP\ \#0}$ may be a predefined or configured countdown step factor associated with the TRP 120. For example, it is assumed that the BFD timer has 4-digit value $(x_1x_0y_1y_0)$, the first countdown step factor $S_{TRP\ \#0}$=2, the first countdown period $P_{TRP\ \#0}$=2, the time step factor M=100 and the current value of the BFD timer is $(06y_1y_0)$. After a first countdown period $P_{TRP\ \#0}$, if the first BFI indication $BFI_{TRP\ \#0}$ is not detected and [Floor (BFD timer/M)–$S_{TRP\ \#0}$]>0, the current value of the BFD timer will be changed from $(06y_1y_0)$ to $(04y_1y_0)$.

In addition, in the second embodiment of the invention, the UE 110 may determine the BFD timer value according to a second countdown step factor $S_{TRP\ \#1}$ after one second reporting period (or second countdown period) $P_{TRP\ \#1}$. The BFD timer value may be determined according to the following condition:

If [Mod(*BFD* timer,*M*)–$S_{TRP\ \#1}$]>0,

*BFD* timer=[Floor(*BFD* timer/*M*)]*M*+[Mod(*BFD* timer,*M*)–$S_{TRP\ \#1}$], else

*BFD* timer=Floor(*BFD* timer/*M*)]*M*, wherein the second countdown step factor $S_{TRP\ \#1}$ may be a predefined or configured countdown step factor associated with the TRP 130. For example, it is assumed that the BFD timer has 4-digit value $(x_1x_0y_1y_0)$, the second countdown step factor $S_{TRP\ \#1}$=1, the second countdown period $P_{TRP\ \#1}$=1, the time step factor M=100 and the current value of the BFD timer is $(x_1x_003)$. After a second countdown period $P_{TRP\ \#1}$, if the second BFI indication $BFI_{TRP\ \#1}$ is not detected and [Mod(BFD timer, M)–$S_{TRP\ \#1}$]>0, the current value of the BFD timer will be changed from $(x_1x_003)$ to $(x_1x_002)$.

In the second embodiment of the invention, the UE 110 may determine a BFI counter according to the number of reported first BFI indication $BFI_{TRP\ \#0}$ and the number of reported second BFI indication $BFI_{TRP\ \#1}$. The definition and operations for the BFI counter are similar to the first embodiment. Therefore, the details will not be repeated again.

Figure 6:
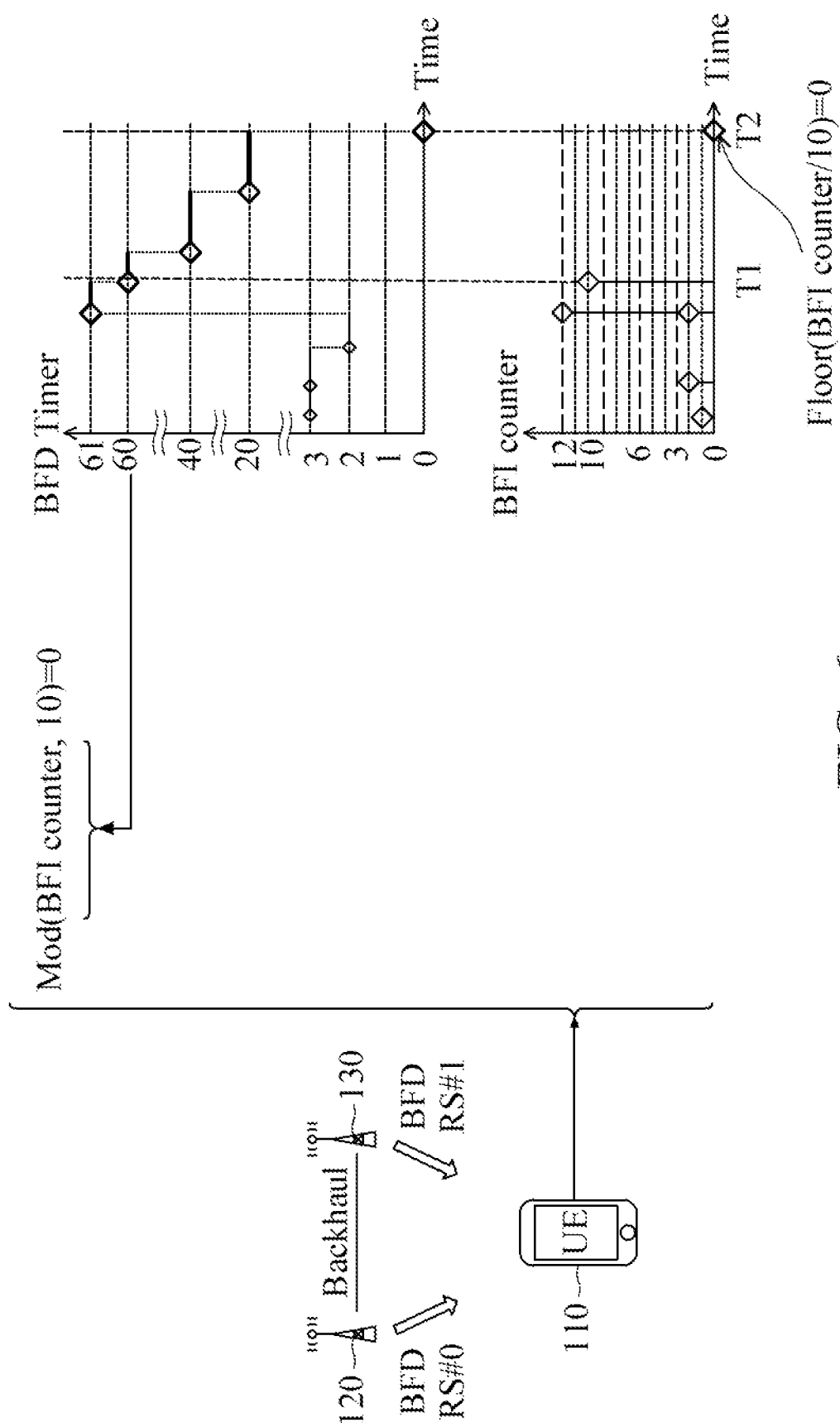
FIG. 6 is a schematic diagram of a BFD operation according to the second embodiment for the BFD procedure of the invention.

FIG. 6 is a schematic diagram of a BFD operation according to the second embodiment for the BFD procedure of the invention. It is assumed that time step factor M=10, first countdown step factor $S_{TRP\ \#0}$=2, second countdown step factor $S_{TRP\ \#1}$=1, the first time factor $T'_{TRP,0}$=6, the second time factor $T'_{TRP,1}$=3, and counter factor K=10 in FIG. 6. In FIG. 6, the symbol "x" means that the radio link quality of the BFD-RS is worse than a threshold (i.e. a BFI indication will be detected) and the symbol "✓" means that the radio link quality of the BFD-RS is better than the threshold (i.e. a beam failure instance indication will not be detected). In the second embodiment, when Mod(BFD timer, M)=0, the UE 110 may set BFI counter=Floor(BFI counter/K)*K. In addition, when Floor(BFD timer/M)=0, the UE 110 may set BFI counter=Mod(BFI counter, K). As shown in FIG. 6, when the higher layer (e.g. MAC layer) receives the second BFI indication $BFI_{TRP\ \#1}$, the UE 110 will start and update the BFD timer according to BFD timer=Floor(BFD timer/M)*M+$T'_{TRP,1}$ (i.e. BFD timer=3) and increase the current value of the BFI counter by 1 (i.e. BFI counter=0*10+1). When the radio link quality of the BFD-RS #1 is worse than the threshold at a second monitoring time point for the second reporting period $P_{TRP\ \#1}$, the second BFI indication $BFI_{TRP\ \#1}$ will be detected in the lower layer (e.g. physical layer) of the UE 110 again and the UE 110 may send the second BFI indication $BFI_{TRP\ \#1}$ to the higher layer (e.g. MAC layer) of the UE 110. When the higher layer (e.g. MAC layer) receives the second BFI indication $BFI_{TRP\ \#1}$, the UE 110 will restart and update the BFD timer according to the equation, BFD timer=Floor (BFD timer/M)*M+$T'_{TRP,1}$ (i.e. BFD timer=3) and increase the current value of the BFI counter by 1 (i.e. BFI counter=0*10+2). When the radio link quality of the BFD-RS #1 is not worse than the threshold at a third monitoring time point for the second reporting period $P_{TRP\ \#1}$, the UE 110 may update the BFD timer by decreasing the BFD timer by the second countdown step factor $S_{TRP\ \#1}$ (i.e. BFD timer is changed to 2).

When the radio link quality of the BFD-RS #1 is not worse than the threshold at a fourth monitoring time point for the second reporting period $P_{TRP\ \#1}$ but the radio link quality of the BFD-RS #0 is worse than the threshold at a second monitoring time point for the first reporting period $P_{TRP\ \#0}$, the first BFI indication $BFI_{TRP\ \#0}$ will be detected in the lower layer (e.g. physical layer) of the UE 110 and the UE 110 may send the first BFI indication $BFI_{TRP\ \#0}$ to the higher layer (e.g. MAC layer) of the UE 110. When the higher layer (e.g. MAC layer) receives the first BFI indication $BFI_{TRP\ \#0}$, the UE 110 may update the BFD timer by decreasing by the second countdown step factor $S_{TRP\ \#1}$ and update the BFD timer according to the equation BFD timer=$T'_{TRP,0}$*M+Mod(BFD timer, M) (i.e. the BFD timer is changed to 61), and the UE 110 may increase the current value of the BFI counter by 10 (i.e. BFI counter=1*10+2).

When the radio link quality of the BFD-RS #1 is not worse than the threshold at a fifth monitoring time point for the second reporting period $P_{TRP\ \#1}$, the UE 120 may update the BFD timer by decreasing the BFD timer by the second countdown step factor $S_{TRP\ \#1}$ (i.e. the 2-digit value of the BFD timer is changed from 61 to 60). In addition, because in the monitoring time point (i.e. time point T1), Mod(BFD timer, M)=0, the UE 110 may set BFI counter=Floor(BFI counter/K)*K (i.e. the 2-digit value of the BFI counter is change from 12 to 10 at time point T1).

When the following monitoring time points for the first reporting period $P_{TRP\ \#1}$ and the second reporting period $P_{TRP\ \#1}$, the first BFI indication $BFI_{TRP\ \#0}$ and the second BFI indication $BFI_{TRP\ \#1}$ will not be detected in the lower layer (e.g. physical layer) of the UE 110, the UE 110 may update the BFD timer by decreasing the BFD timer by the first countdown step factor $S_{TRP\ \#0}$ at each of following monitoring time points for the first reporting period $P_{TRP\ \#1}$ until the BFD timer returns to 0. When the BFD timer expires at time point T2, because Floor(BFD timer/M)=0, the UE 110 may set BFI counter=Mod(BFI counter, K) (i.e. the 2-digit value of the BFI counter is change from 10 to 00 at time point T1).

According to a third embodiment for the BFD procedure of the invention, the separate BFD timer for the TRP 120 and TRP 130 may be configured in the UE 110. The UE 110 may start or restart a first BFD timer $T_{TRP,0}$ upon receiving the corresponding first BFI indication $BFI_{TRP\ \#0}$ from a lower layer (e.g. the physical layer) to the higher layer (e.g. MAC layer) and start or restart a second BFD timer $T_{TRP,1}$ upon receiving the corresponding second BFI indication $BFI_{TRP\ \#1}$ from a lower layer (e.g. the physical layer) to the higher layer (e.g. MAC layer). The definitions and operations for the first BFD timer and the second BFD timer are similar to the first embodiment. Therefore, the details will not be repeated again. In addition, in the third embodiment, the separate BFI counter for the TRP 120 and TRP 130 may be determined by the UE 110. The UE 110 may determine a first BFI counter for the TRP 120 according to the number of reported first BFI indication $BFI_{TRP\ \#0}$ (i.e. the first BFI counter=$n_{BFI,0}$) and determine a second BFI counter for the TRP 130 according to the number of reported second BFI indication $BFI_{TRP\ \#1}$ (i.e. the second BFI counter=$n_{BFI,1}$). In the third embodiment, the UE 110 may declare that a beam failure occurs in the TRP 120, when the number of reported first BFI indication $BFI_{TRP\ \#0}$ is above or equal to a first threshold $C_{max,\ TRP0}$ (i.e. $n_{BFI,0} \geq C_{max,\ TRP0}$), wherein the $C_{max,\ TRP0}$ is the first threshold for triggering beam failure recovery associated with the TRP 120. In addition, the UE 110 may declare that a beam failure occurs in the TRP 130, when the number of reported second BFI indication $BFI_{TRP\ \#1}$ is above or equal to a second threshold $C_{max,\ TRP1}$ (i.e. $n_{BFI,1} \geq C_{max,\ TRP1}$), wherein the $C_{max,\ TRP1}$ is the second threshold for triggering beam failure recovery associated with the TRP 130. In addition, the UE 110 may declare that the beam failures occurs in both TRP 120 and TRP 130, if the number of reported first BFI indication $BFI_{TRP\ \#0}$ is above or equal to a first threshold $C_{max,\ TRP0}$ and the number of reported second BFI indication $BFI_{TRP\ \#1}$ is above or equal to a second threshold $C_{max,\ TRP1}$ (i.e. $n_{BFI,0} \geq C_{max}$) and ($n_{BFI,1} \geq C_{max}$).

FIG. 7 is a schematic diagram of beam failure for the TRP 120 and TRP 130 according to the third embodiment for the BFD procedure of the invention. It is assumed that the first threshold $C_{max,\ TRP0}$=3 and the second threshold $C_{max,\ TRP1}$=3 in FIG. 7. In FIG. 7, the symbol "x" means that the radio link quality of the BFD-RS is worse than a threshold (i.e. a BFI indication will be detected) and the symbol "✓" means that the radio link quality of the BFD-RS is better than the threshold (i.e. a beam failure instance indication will not be detected). As shown in FIG. 7, when the radio link quality of the BFD-RS #0 is worse than a threshold at a first monitoring time point for the first reporting period $P_{TRP\ \#0}$, the first BFI indication $BFI_{TRP\ \#0}$ will be detected in the lower layer (e.g. physical layer) of the UE 110 and the UE 110 may send the first BFI indication $BFI_{TRP\ \#0}$ to the higher layer (e.g. MAC layer) of the UE 110. When the higher layer (e.g. MAC layer) receives the first BFI indication $BFI_{TRP\ \#0}$, the UE 110 will start the first BFD timer $T_{TRP,0}$ and increase the current value of the first BFI counter by 1 (i.e. first BFI counter=1). When the radio link quality of the BFD-RS #0 is worse than a threshold at a second monitoring time point for the first reporting period $P_{TRP\ \#0}$, the first BFI indication $BFI_{TRP\ \#0}$ will be detected in the lower layer (e.g. physical layer) of the UE 110 again and the UE 110 may send the first BFI indication $BFI_{TRP\ \#0}$ to the higher layer (e.g. MAC layer) of the UE 110. When the higher layer (e.g. MAC layer) receives the first BFI indication $BFI_{TRP\ \#0}$, the UE 110 will restart the first BFD timer $T_{TRP,0}$ and increase the current value of the first BFI counter by 1 (i.e. first BFI counter=2). When the radio link quality of the BFD-RS #0 is worse than a threshold at a third monitoring time point for the first reporting period $P_{TRP\ \#0}$, the first BFI indication $BFI_{TRP\ \#0}$ will be detected in the lower layer (e.g. physical layer) of the UE 110 again and the UE 110 may send the first BFI indication $BFI_{TRP\ \#0}$ to the higher layer (e.g. MAC layer) of the UE 110. When the higher layer (e.g. MAC layer) receives the first BFI indication $BFI_{TRP\ \#0}$, the UE 110 will restart the first BFD timer $T_{TRP,0}$ and increase the current value of the first BFI counter by 1 (i.e. BFI counter=3). Because the first BFI counter=3 has satisfied the condition: $n_{BFI,0} \geq C_{max,\ TRP0}$, the UE 110 will declare that a beam failure occurs in the TRP 120, i.e. a new candidate beam needs to be found for the TRP 120.

Furthermore, as shown in FIG. 7, when the radio link quality of the BFD-RS #1 is worse than a threshold at a first monitoring time point for the second reporting period $P_{TRP\ \#1}$, the second BFI indication $BFI_{TRP\ \#1}$ will be detected in the lower layer (e.g. physical layer) of the UE 110 and the UE 110 may send the second BFI indication $BFI_{TRP\ \#1}$ to the higher layer (e.g. MAC layer) of the UE 110. When the higher layer (e.g. MAC layer) receives the second BFI indication $BFI_{TRP\ \#1}$, the UE 110 will start the second BFD timer $T_{TRP,1}$ and increase the current value of the second BFI counter by 1 (i.e. second BFI counter=1). When the radio link quality of the BFD-RS #1 is worse than the threshold at a second monitoring time point for the second reporting period $P_{TRP\ \#1}$, the second BFI indication $BFI_{TRP\ \#1}$ will be detected in the lower layer (e.g. physical layer) of the UE 110 again and the UE 110 may send the second BFI indication $BFI_{TRP\ \#1}$ to the higher layer (e.g. MAC layer) of the UE 110. When the higher layer (e.g. MAC layer) receives the second BFI indication $BFI_{TRP\ \#1}$, the UE 110 will restart the second BFD timer $T_{TRP,1}$ and increase the current value of the second BFI counter by 1 (i.e. second BFI counter=2). When the radio link quality of the BFD-RS #1 is worse than the threshold at a third monitoring time point for the second reporting period $P_{TRP\ \#1}$, the second BFI indication $BFI_{TRP\ \#1}$ will be detected in the lower layer (e.g. physical layer) of the UE 110 again and the UE 110 may send the second BFI indication $BFI_{TRP\ \#1}$ to the higher layer (e.g. MAC layer) of the UE 110. When the higher layer (e.g. MAC layer) receives the second BFI indication $BFI_{TRP\ \#1}$, the UE 110 will restart the second BFD timer $T_{TRP,1}$ and increase the current value of the second BFI counter by 1 (i.e. BFI counter=3). Because the second BFI counter=3 has satisfied the condition: $n_{BFI,1} \geq C_{max,\ TRP1}$, the UE 110 will declare that a beam failure occurs in the TRP 130, i.e. a new candidate beam needs to be found for the TRP 130.

According to a fourth embodiment for the BFD procedure of the invention, only one BFD timer is configured in the UE 110 and the UE 110 may determine a BFI counter according to the number of reported first BFI indication $BFI_{TRP\ \#0}$ and the number of reported second BFI indication $BFI_{TRP\ \#1}$. The difference between the second embodiment and fourth embodiment is that in the fourth embodiment the BFD timer is configured in lower layer (e.g. physical layer) of the UE 110. Therefore, in the fourth embodiment, when the UE 110 detects the first BFI indication $BFI_{TRP\ \#0}$ and/or the second BFI indication $BFI_{TRP\ \#1}$ in the lower layer, the UE 110 may update the BFD timer in the lower layer. The definitions and operations for the BFD timer and the BFI counter are similar to the second embodiment. Therefore, the details will not be repeated again.

Back to FIG. 3, in step S320, the UE 310 may declare that a beam failure occurs in the TRP 310 and then find a new candidate beam for the TRP 310.

Figure 8A:
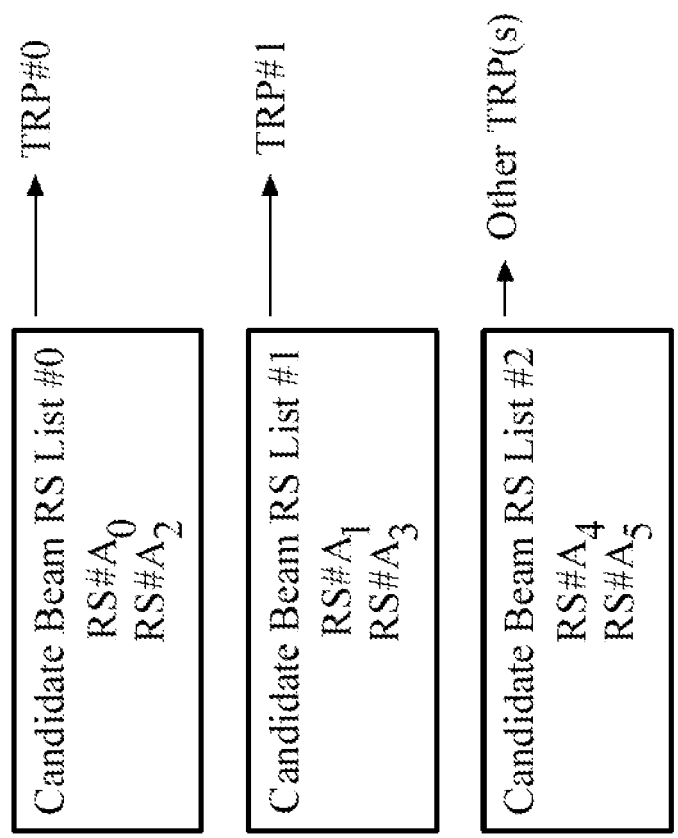
FIG. 8A is a schematic diagram of configured candidate-beam RS lists according to an embodiment of the invention.

In an embodiment of the invention, the UE 110 may be configured at least one candidate-beam RS list by the base station(s) (e.g. TRP 120, TRP 130), wherein each candidate-beam RS list may be associated with an index or identity (e.g. CORESETPoolIndex, TRP_ID or a BFD-RS set ID/index, but the invention should not be limited thereto). FIG. 8A is a schematic diagram of configured candidate-beam RS lists according to an embodiment of the invention. As shown in FIG. 8A, the candidate-beam RS list #0 associated with the TRP 120, the candidate-beam RS list #1 associated with the TRP 130 and the candidate-beam RS list #2 associated with another TRP (or other TRP(s)) may be configured to the UE 110 by the TRP 120, the TRP 130 and another TRP respectively. The candidate-beam RS list #0 may comprise RS #$A_0$ and RS #$A_2$. The candidate-beam RS list #1 may comprise RS #$A_1$ and RS #$A_3$. The candidate-beam RS list #2 may comprise RS #$A_4$ and RS #$A_5$. It should be noted that the candidate-beam RS lists of FIG. 8A may be only used to illustrate the embodiment of the invention, but the invention should not be limited thereto.

Figure 8B:
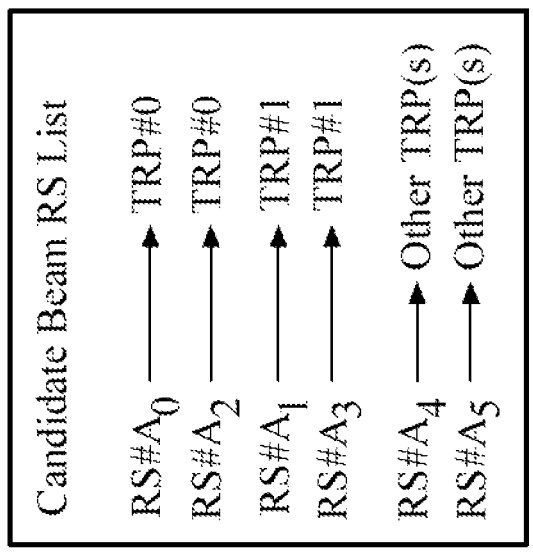
FIG. 8B is a schematic diagram of configured a candidate-beam RS list according to another embodiment of the invention.

In another embodiment of the invention, the UE 110 may be configured only one candidate-beam RS list by the base station (e.g. TRP 120, TRP 130), wherein each RS in the candidate-beam RS list may be associated with an index or identity (e.g. CORESETPoolIndex, TRP_ID or a BFD-RS set ID/index, but the invention should not be limited thereto). FIG. 8B is a schematic diagram of configured candidate-beam RS list according to another embodiment of the invention. As shown in FIG. 8B, a candidate-beam RS list may be configured to the UE 110, wherein the candidate-beam RS list comprises the RS #$A_0$ and RS #$A_2$ associated with the TRP 120, the RS #$A_1$ and RS #$A_3$ associated with the TRP 130 and the RS #$A_4$ and RS #$A_5$ associated with another TRP (or other TRP(s)). It should be noted that the candidate-beam RS list of FIG. 8B may be only used to illustrate the embodiment of the invention, but the invention should not be limited thereto.

In the embodiments of the invention, the UE 110 may determine a measurement report and a reporting type for the candidate beam RS according to at least one of the following information, a default measurement report and reporting type, a higher layer configuration (e.g. random resource control (RRC) and/or medium-access-control control-element (MAC CE)) and UE's capability. In addition, in the embodiments of the invention, the measurement and the reporting type may support single-TRP or Multi-TRP operation.

Figure 9A:
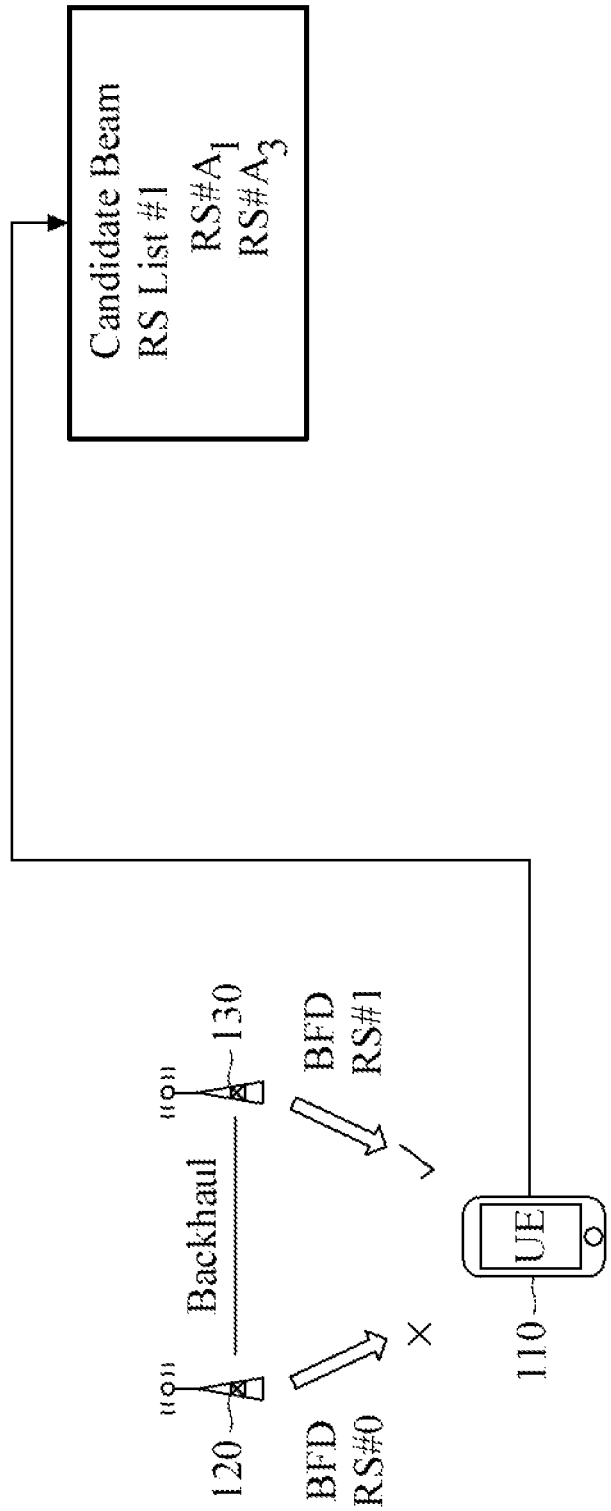
FIG. 9A is a schematic diagram of the measurement for the candidate beam RS according to an embodiment of the invention.

In an embodiment of the invention, if a beam failure event is associated with an index or an identity (e.g. CORESETPoolIndex, TRP_ID, or a BFD-RS set ID/index, but the invention should not be limited thereto) is declared, the UE 110 may determine (or find) a candidate beam from the candidate-beam RS list(s) which associated with the TRP(s) that might not be declared a beam failure. Taking FIG. 9A for example, FIG. 9A is a schematic diagram of the measurement for the candidate beam RS according to an embodiment of the invention. As shown in FIG. 9A, when a beam failure occurs in the TRP 120, the UE 110 may perform a measurement of RS (s) within the candidate-beam RS list #1 associated with the TRP 130 to find or determine a candidate beam. It should be noted that FIG. 9A is only used to illustrate the embodiment of the invention, but the invention should not be limited thereto.

Figure 9B:
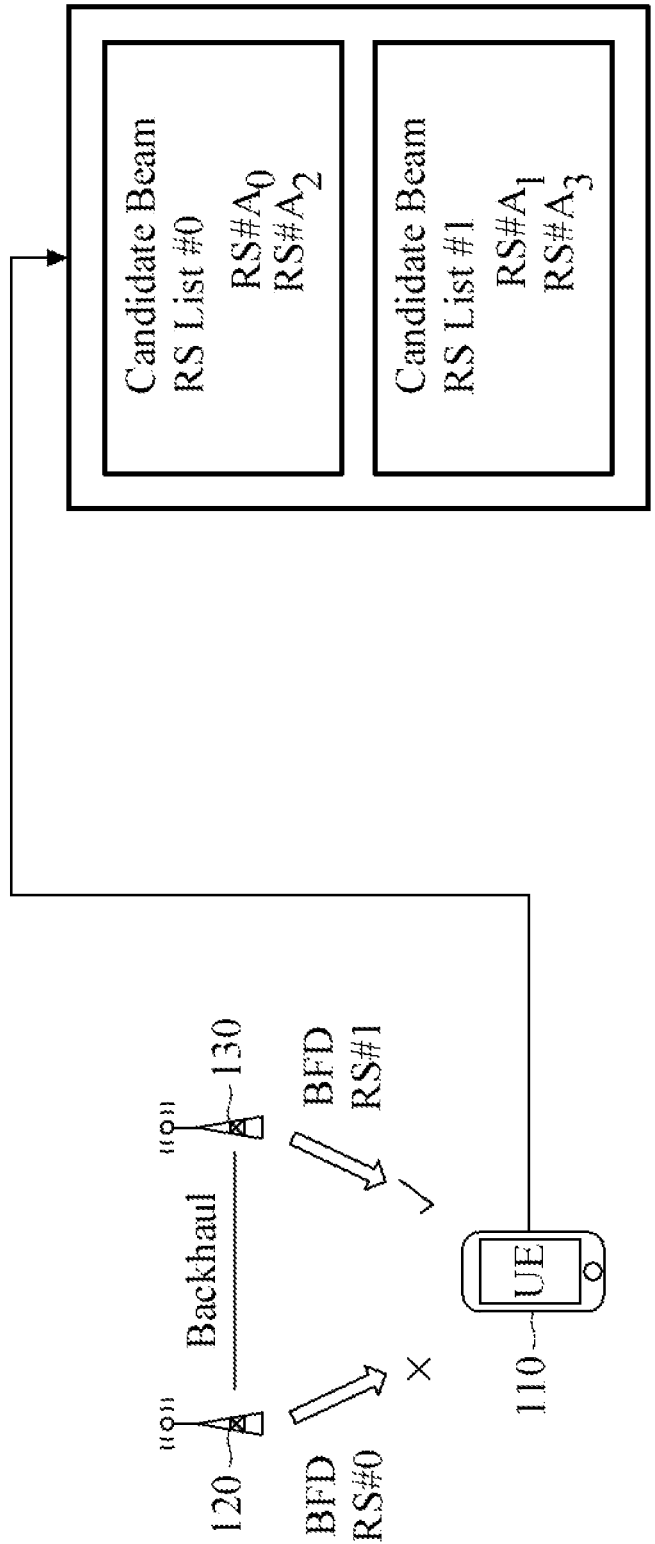
FIG. 9B is a schematic diagram of the measurement for the candidate beam RS according to another embodiment of the invention.

In another embodiment of the invention, if a beam failure event is associated with an index or an identity (e.g. CORESETPoolIndex, TRP_ID, or a BFD-RS set ID/index but the invention should not be limited thereto) is declared, the UE 110 may determine a candidate beam from all of the candidate-beam RS lists associated with the serving TRPs. Taking FIG. 9B for example, FIG. 9B is a schematic diagram of the measurement for the candidate beam RS according to another embodiment of the invention. As shown in FIG. 9B, when a beam failure occurs in the TRP 120, the UE 110 may perform a measurement of RS (s) within the candidate-beam RS list #0 associated with the TRP 120 and the candidate-beam RS list #1 associated with the TRP 130 to find or determine a candidate beam. It should be noted that FIG. 9B is only used to illustrate the embodiment of the invention, but the invention should not be limited thereto.

Figure 9C:
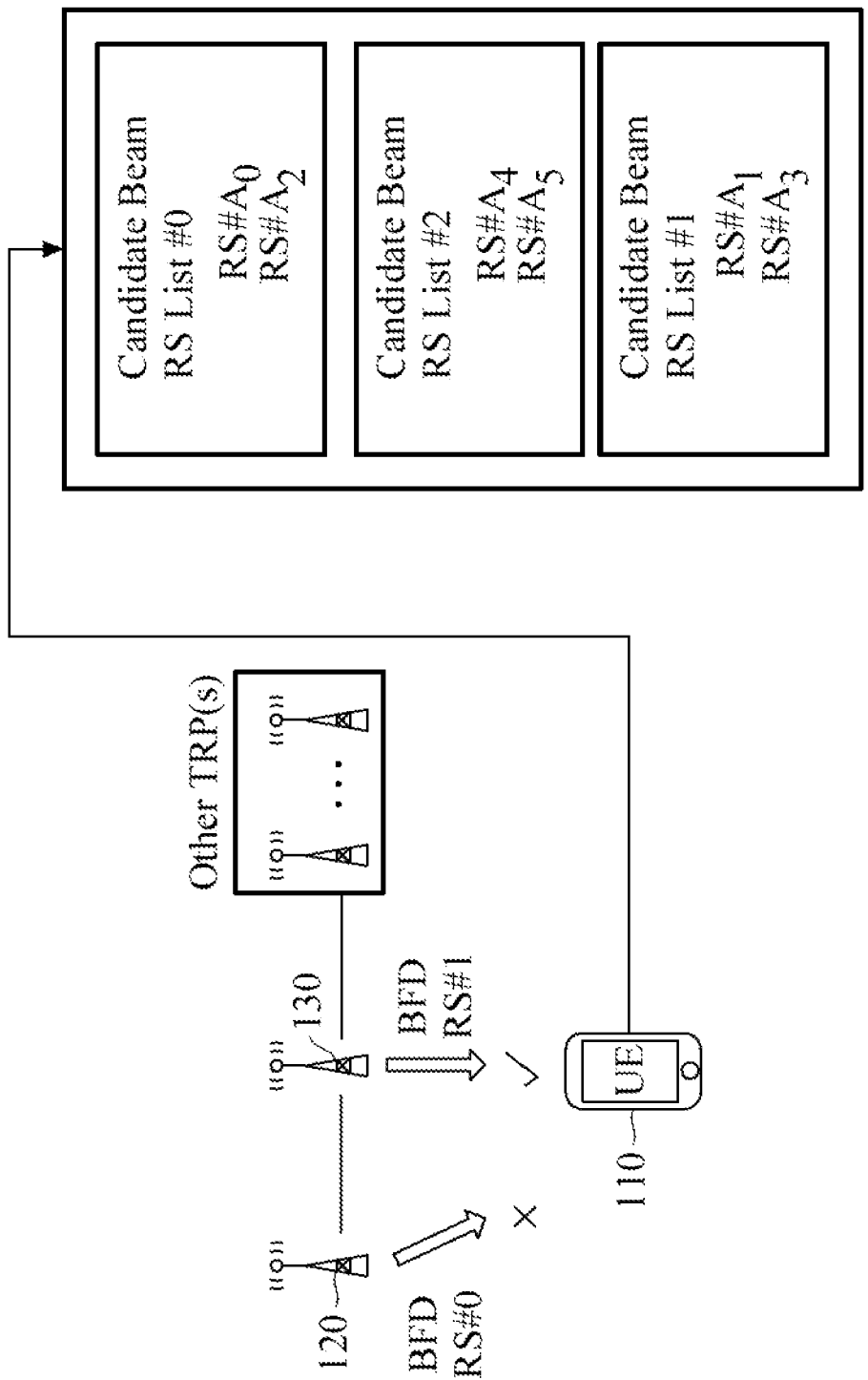
FIG. 9C is a schematic diagram of the measurement for the candidate beam RS according to another embodiment of the invention.

In another embodiment of the invention, if a beam failure event is associated with an index or an identity (e.g. CORESETPoolIndex, TRP_ID, or a BFD-RS set ID/index but the invention should not be limited thereto) is declared, the UE 110 may determine a candidate beam from all of the candidate-beam RS lists. Taking FIG. 9C for example, FIG. 9C is a schematic diagram of the measurement for the candidate beam RS according to another embodiment of the invention. As shown in FIG. 9C, when a beam failure occurs in the TRP 120, the UE 110 may perform a measurement of RS (s) within the candidate-beam RS list #0 associated with the TRP 120, the candidate-beam RS list #1 associated with the TRP 130 and the candidate-beam RS list #2 associated with another TRP which is not a serving TRP to find or determine a candidate beam. It should be noted that FIG. 9C is only used to illustrate the embodiment of the invention, but the invention should not be limited thereto.

In another embodiment of the invention, if a beam failure event is associated with an index or an identity (e.g. CORESETPoolIndex, TRP_ID, or a BFD-RS set ID/index but the invention should not be limited thereto) is declared, the UE 110 may not perform a measurement to determine a possible candidate beam, i.e. the UE may fallback to single TRP operation. For example, when a beam failure occurs in the TRP 120, the UE 110 may not perform a measurement of RS (s) within all of the candidate-beam RS lists.

Figure 9D:
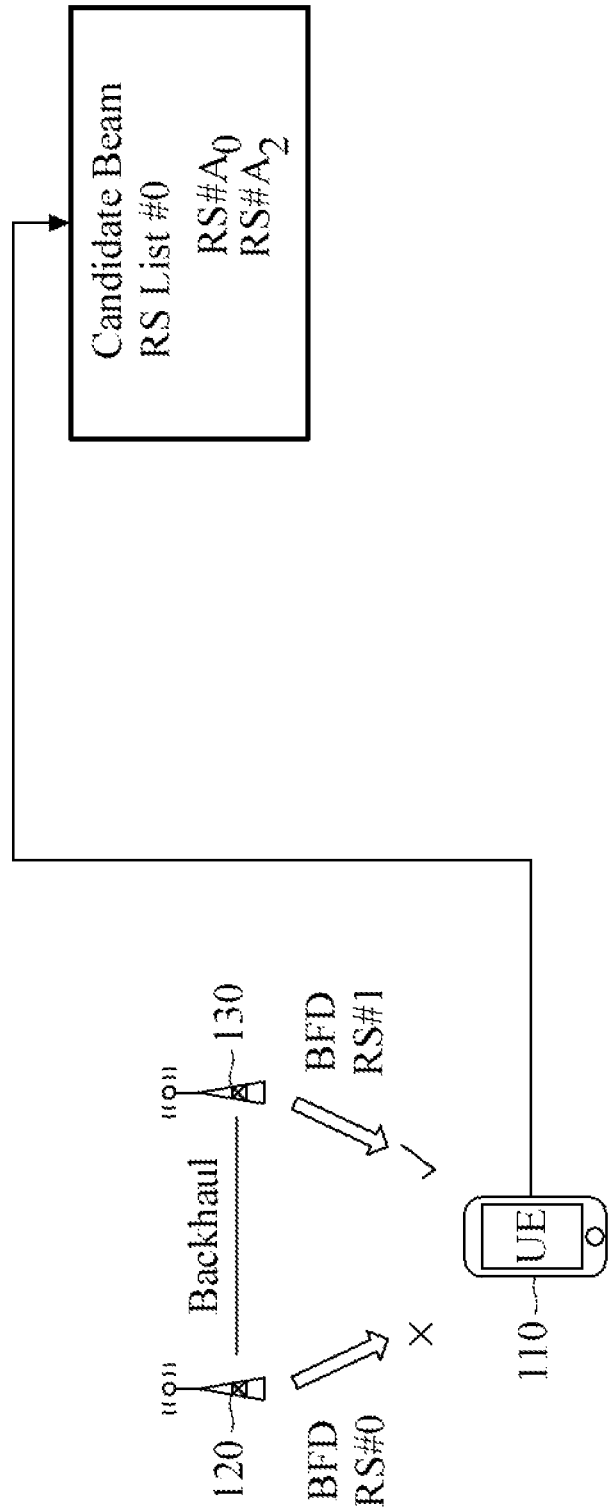
FIG. 9D is a schematic diagram of the measurement for the candidate beam RS according to another embodiment of the invention.

In another embodiment of the invention, if a beam failure event is associated with an index or an identity (e.g. CORESETPoolIndex, TRP_ID, or a BFD-RS set ID/index but the invention should not be limited thereto) is declared, the UE 110 may determine a candidate beam from the candidate-beam RS list which associated with the TRP that may be declared a beam failure. In the embodiment, the UE 110 may determine a candidate-beam RS that may be received with the surviving beam RS simultaneously. That is to say, in the embodiment, in order to recover the multi-TRP operation, the UE 110 may try to re-establish the connection with the other TRP besides the TRP which has not been declared a beam failure. Taking FIG. 9D for example, FIG. 9D is a schematic diagram of the measurement for the candidate beam RS according to another embodiment of the invention. As shown in FIG. 9D, when a beam failure occurs in the TRP 120, the UE 110 may perform a measurement of RS (s) within the candidate-beam RS list #0 associated with the TRP 120 to find or determine a candidate-beam RS which may be received with the surviving BFD-RS #1 simultaneously. It should be noted that FIG. 9D is only used to illustrate the embodiment of the invention, but the invention should not be limited thereto.

Figure 9E:
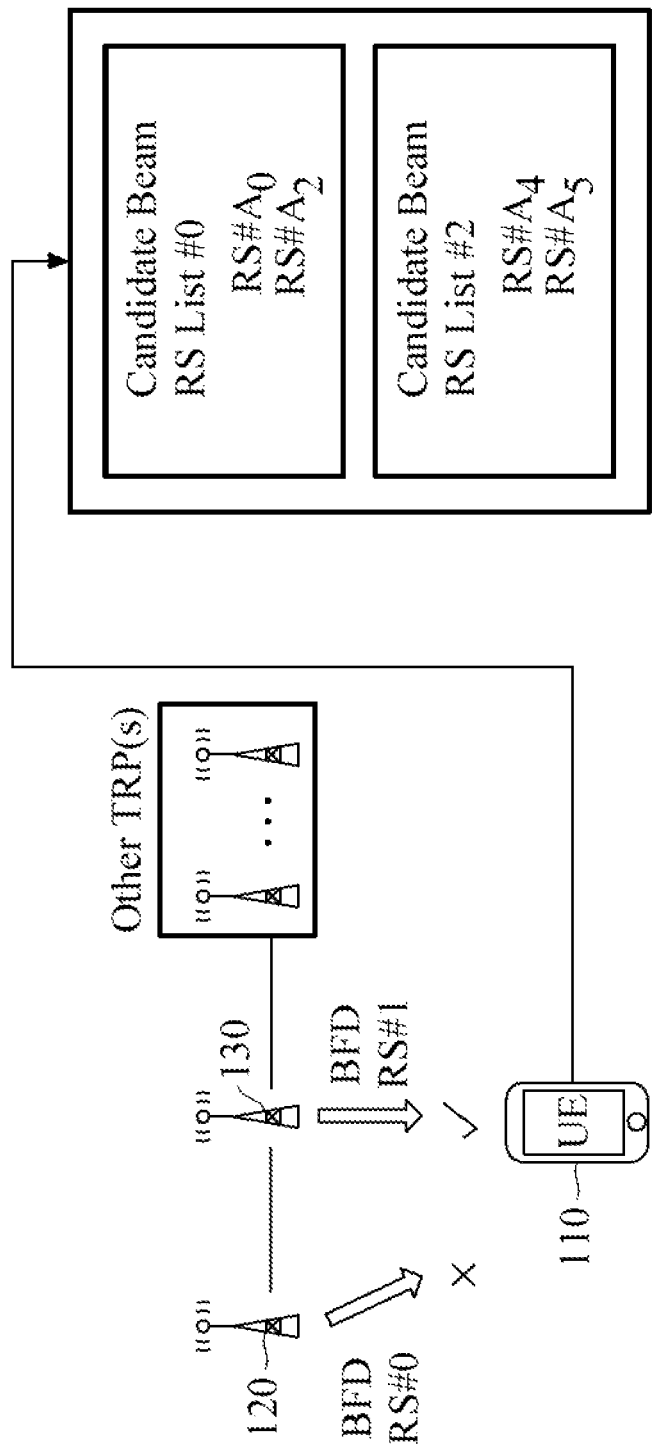
FIG. 9E is a schematic diagram of the measurement for the candidate beam RS according to another embodiment of the invention.

In another embodiment of the invention, if a beam failure event is associated with an index or an identity (e.g. CORE- SETPoolIndex, TRP_ID, or a BFD-RS set ID/index but the invention should not be limited thereto) is declared, the UE 110 may determine a candidate beam from the candidate-beam RS lists which associated with the TRPs except for the TRP which has not been declared a beam failure. In the embodiment, the UE 110 may determine a candidate-beam RS that may be simultaneously received with the surviving beam RS associate with the TRP which has not been declared a beam failure. That is to say, in the embodiment, in order to recover the multi-TRP operation, the UE 110 may try to re-establish the connection with the other TRP besides the TRP which has not been declared a beam failure. Taking FIG. 9E for example, FIG. 9E is a schematic diagram of the measurement for the candidate beam RS according to another embodiment of the invention. As shown in FIG. 9E, when a beam failure occurs in the TRP 120, the UE 110 may perform a measurement of RS (s) within the candidate-beam RS list #0 associated with the TRP 120 and the candidate-beam RS list #2 associated with another TRP to find or determine a candidate-beam RS which may be received with the surviving BFD-RS #1 simultaneously. It should be noted that FIG. 9E is only used to illustrate the embodiment of the invention, but the invention should not be limited thereto.

Figure 9F:
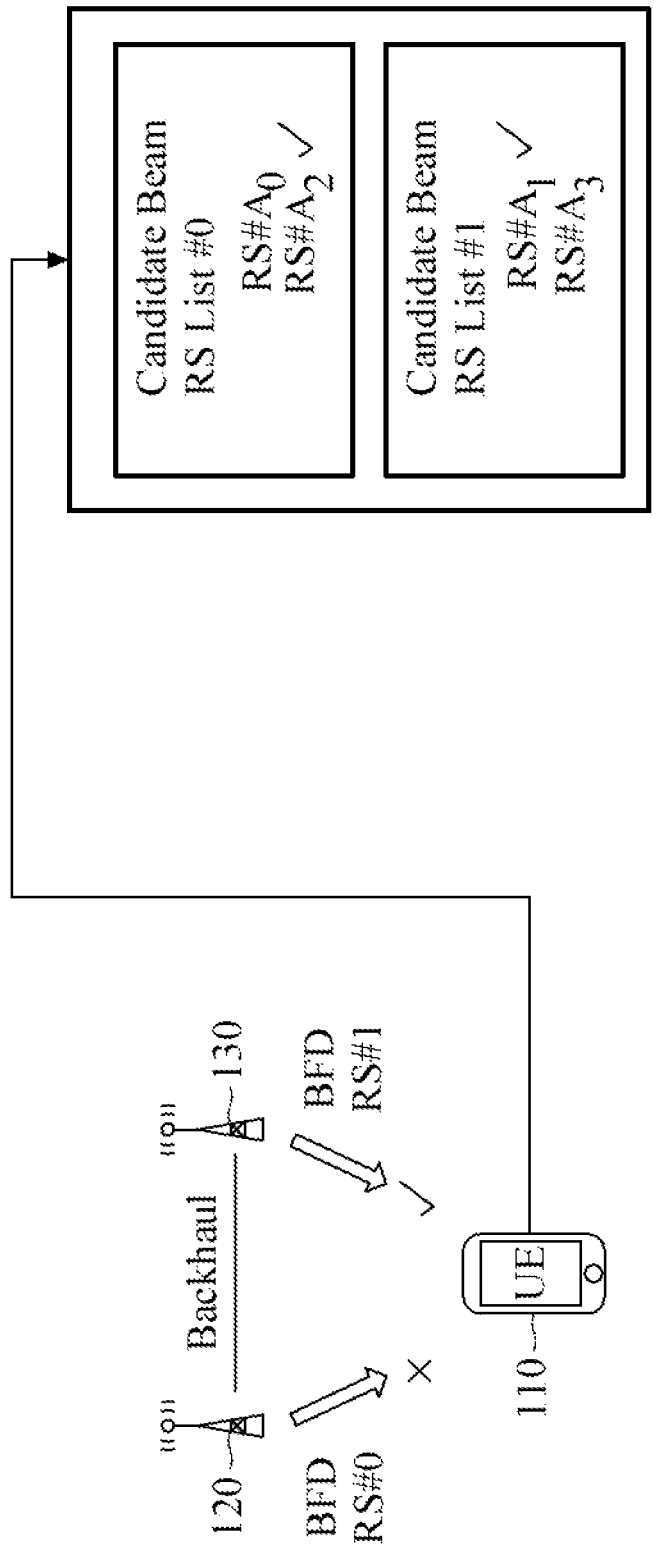
FIG. 9F is a schematic diagram of the measurement for the candidate beam RS according to another embodiment of the invention.

In another embodiment of the invention, if a beam failure event is associated with an index or an identity (e.g. CORE-SETPoolIndex, TRP_ID, or a BFD-RS set ID/index but the invention should not be limited thereto) is declared, the UE 110 may determine at least two candidate beams from all of the candidate-beam RS lists which associated with the serving TRPs. In the embodiment, the UE 110 may determine at least two candidate-beam RSs that may be received simultaneously. That is to say, in the embodiment, in order to recover the multi-TRP operation, the UE 110 may try to re-establish the connection with the other TRP besides the TRP which has not been declared a beam failure. Taking FIG. 9F for example, FIG. 9F is a schematic diagram of the measurement for the candidate beam RS according to another embodiment of the invention. As shown in FIG. 9F, when a beam failure occurs in the TRP 120, the UE 110 may perform a measurement of RS (s) within the candidate-beam RS list #0 associated with the TRP 120 and the candidate-beam RS list #1 associated with TRP 130 to find or determine at least two candidate beam RSs (e.g. RS #$A_2$ and RS #$A_1$) which may be received simultaneously by the UE. It should be noted that FIG. 9F is only used to illustrate the embodiment of the invention, but the invention should not be limited thereto.

Figure 9G:
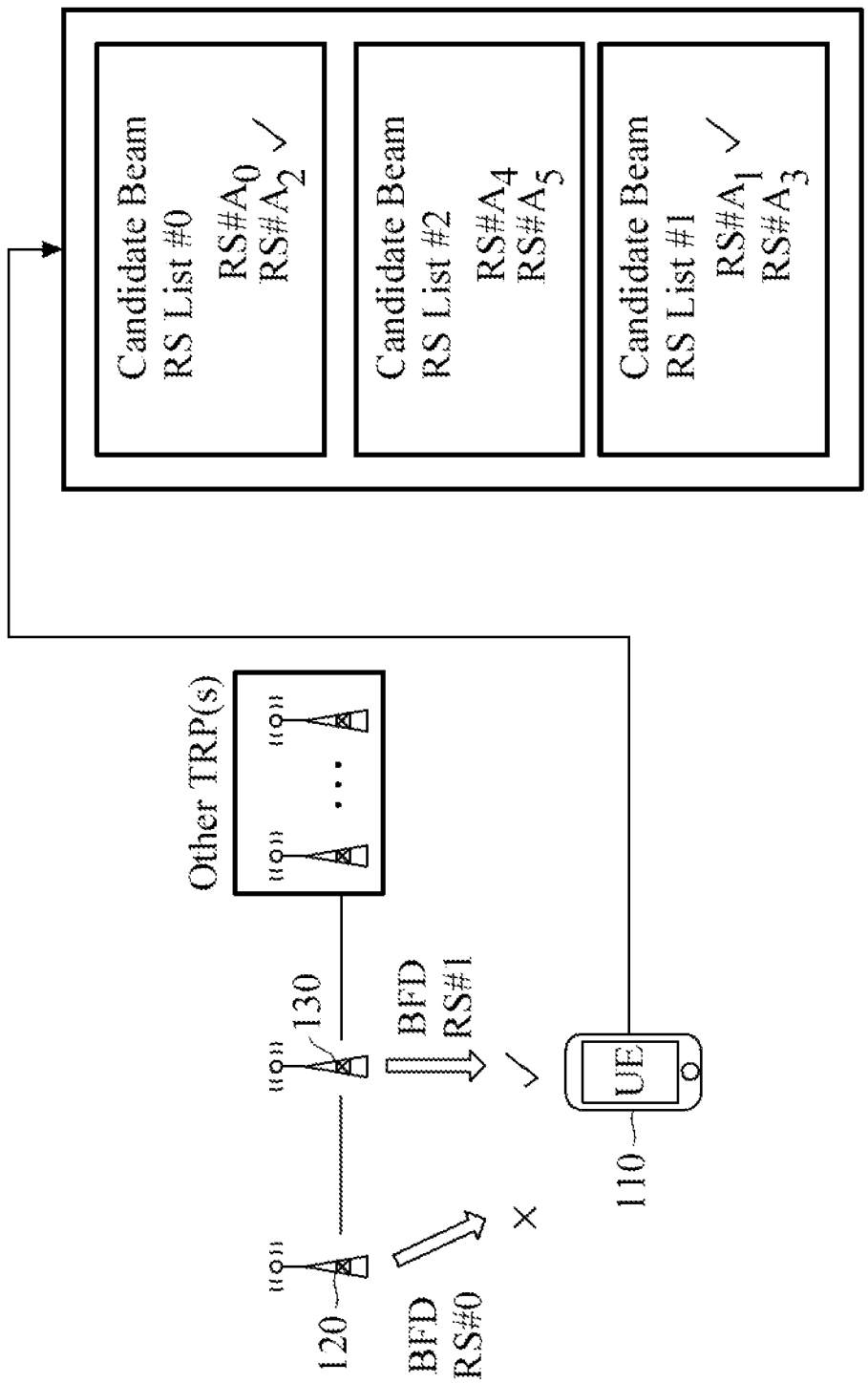
FIG. 9G is a schematic diagram of the measurement for the candidate beam RS according to another embodiment of the invention.

In another embodiment of the invention, if a beam failure event is associated with an index or an identity (e.g. CORE-SETPoolIndex, TRP_ID, or a BFD-RS set ID/index but the invention should not be limited thereto) is declared, the UE 110 may determine at least two candidate beams from all of the candidate-beam RS lists. In the embodiment, the UE 110 may determine at least two candidate-beam RSs that may be received simultaneously. That is to say, in the embodiment, in order to recover the multi-TRP operation, the UE 110 may try to re-establish the connection with the other TRP besides the TRP which has not been declared a beam failure. Taking FIG. 9G for example, FIG. 9G is a schematic diagram of the measurement for the candidate beam RS according to another embodiment of the invention. As shown in FIG. 9G, when a beam failure occurs in the TRP 120, the UE 110 may perform a measurement of RS (s) within the candidate-beam RS list #0 associated with the TRP 120, the candidate-beam RS list #1 associated with the TRP 130 and the candidate-beam RS list #2 associated with another TRP to find or determine at least two candidate beam RSs (e.g. RS #$A_2$ and RS #$A_1$) which may be received simultaneously by the UE 110. It should be noted that FIG. 9G is only used to illustrate the embodiment of the invention, but the invention should not be limited thereto.

Figure 10:
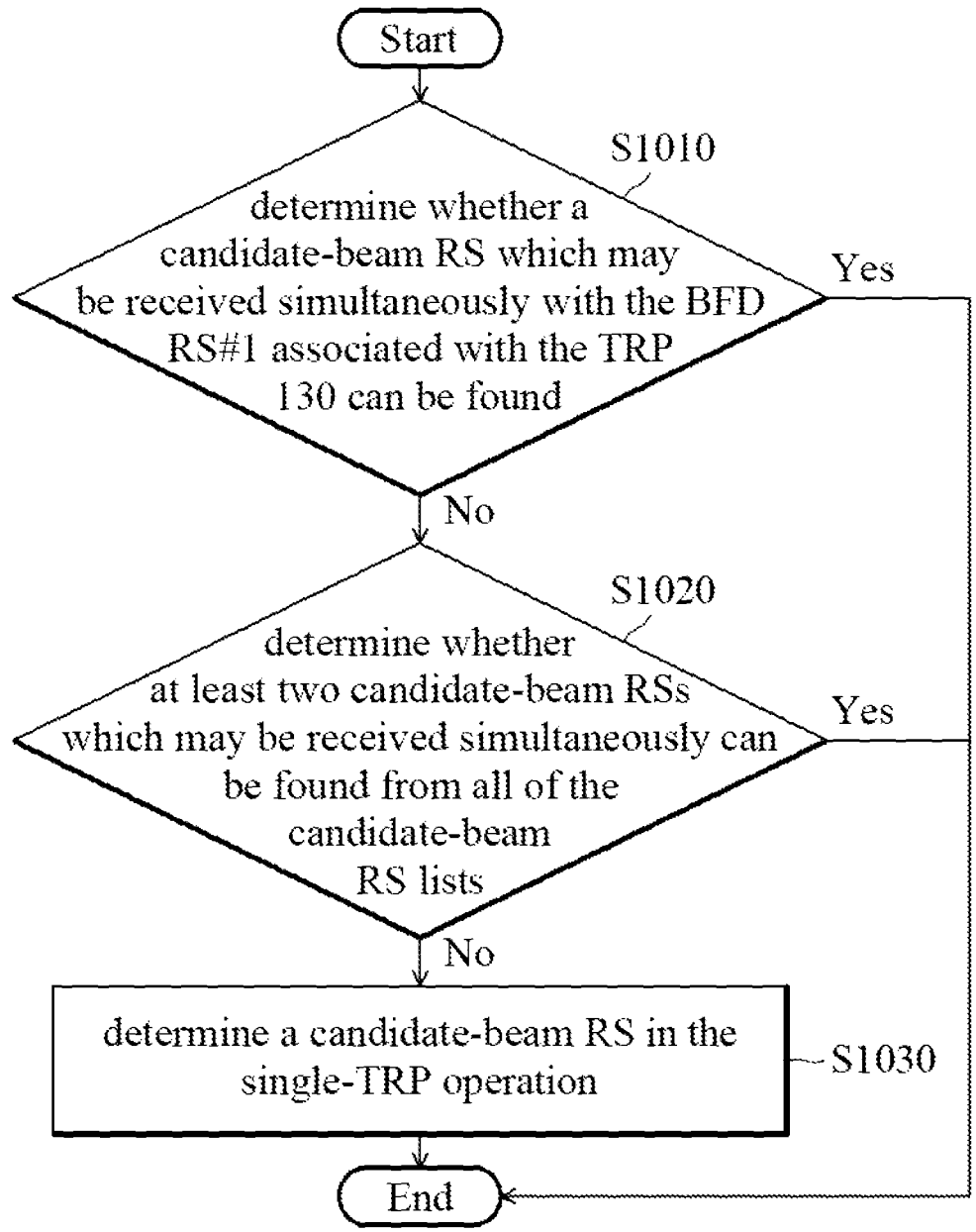
FIG. 10 is a flow chart illustrating a measurement method for the candidate beam RS according to an embodiment of the invention.

FIG. 10 is a flow chart illustrating a measurement method for the candidate beam RS according to an embodiment of the invention. The measurement method can be applied to the wireless communication system 200. In step S1010, when a beam failure occurs in the TRP 120 declared by the UE 110, the UE 110 may determine whether a candidate-beam RS which may be received simultaneously with the BFD-RS #1 associated with the TRP 130 can be found. In the measurement method, the operations discussed in FIG. 9D or FIG. 9E may be applied to step S1010.

If a candidate-beam RS which may be received simultaneously with the BFD-RS #1 associated with the TRP 130 cannot be found, step S1020 is performed. In step S1020, the UE 110 may determine whether at least two candidate-beam RSs which may be received simultaneously can be found from all of the candidate-beam RS lists. In the measurement method, the operations discussed in FIG. 9F or FIG. 9G may be applied to step S1020.

If at least two candidate-beam RSs which may be received simultaneously cannot be found from all of the candidate-beam RS lists, step S1030 is performed. In step S1030, the UE 110 may determine a candidate-beam RS in the single-TRP operation. In the measurement method, the operations discussed in FIG. 9A, FIG. 9B or FIG. 9C may be applied to step S1030.

Figure 11:
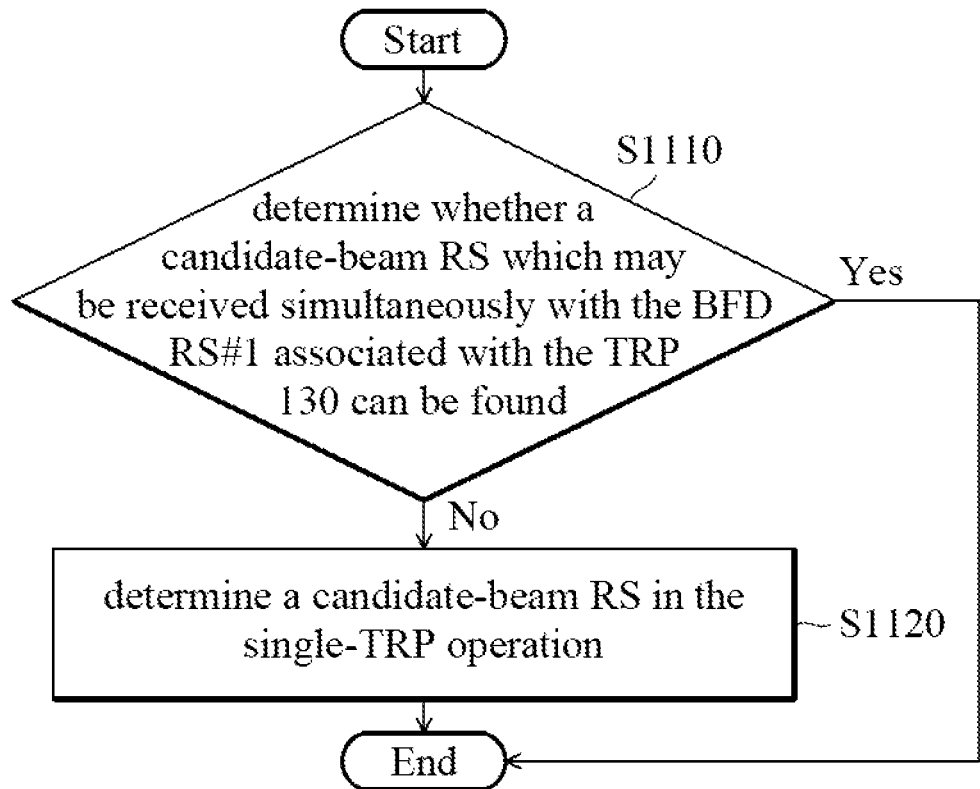
FIG. 11 is a flow chart illustrating a measurement method for the candidate beam RS according to another embodiment of the invention.

FIG. 11 is a flow chart illustrating a measurement method for the candidate beam RS according to another embodiment of the invention. The measurement method can be applied to the UE 110. In step S1110, when the TRP 120 is declared a beam failure by the UE 110, the UE 110 may determine whether a candidate-beam RS which may be received simultaneously with the BFD-RS #1 associated with the TRP 130 can be found. In the measurement method, the operations discussed in FIG. 9D or FIG. 9E may be applied to step S1110.

If a candidate-beam RS which may be received simultaneously with the BFD-RS #1 associated with the TRP 130 cannot be found, step S1120 is performed. In step S1120, the UE 110 may determine a candidate-beam RS in the single-TRP operation. In the measurement method, the operations discussed in FIG. 9A, FIG. 9B or FIG. 9C may be applied to step S1120.

Figure 12:
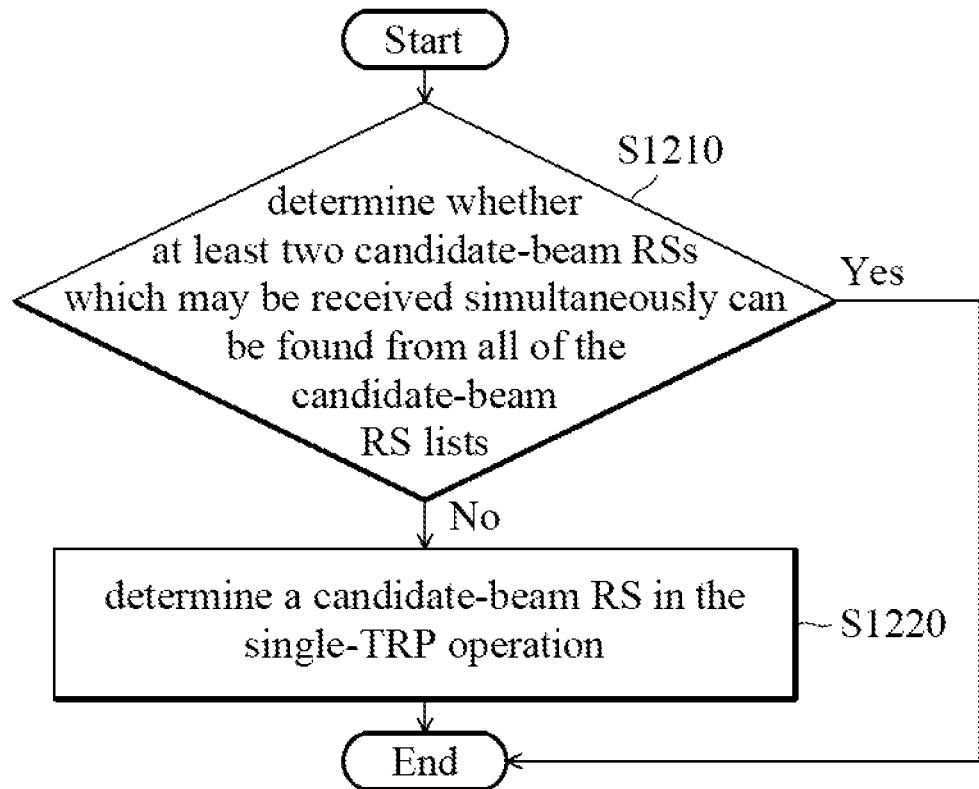
FIG. 12 is a flow chart illustrating a measurement method for the candidate beam RS according to another embodiment of the invention.

FIG. 12 is a flow chart illustrating a measurement method for the candidate beam RS according to another embodiment of the invention. The measurement method can be applied to the UE 110. In step S1210, when the TRP 120 is declared a beam failure by the UE 110, the UE 110 may determine whether at least two candidate-beam RSs which may be received simultaneously can be found from all of the candidate-beam RS lists. In the measurement method, the operations discussed in FIG. 9F or FIG. 9G may be applied to step S1210.

If at least two candidate-beam RSs which may be received simultaneously cannot be found from all of the candidate-beam RS lists, step S1220. In step S1220, the UE 110 may determine a candidate-beam RS in the single-TRP operation. In the measurement method, the operations discussed in FIG. 9A, FIG. 9B or FIG. 9C may be applied to step S1220.

Back to FIG. 3, in step S330, the UE 310 may transmit a scheduling request for the BFR to the TRP 310.

Figure 13A:
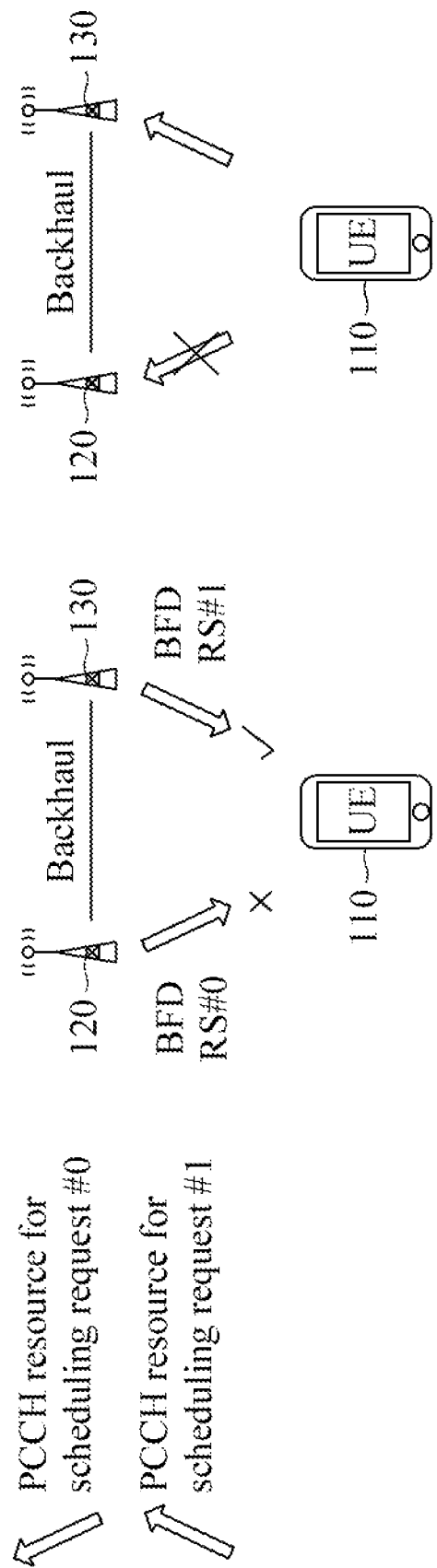
FIG. 13A is a schematic diagram of transmitting the PUCCH resource corresponding to the scheduling request according to an embodiment of the invention.

In an embodiment of the invention, the UE 110 may be configured at least one physical uplink control channel (PUCCH) resource associated with corresponding scheduling requests for reporting the information related to the BFR, each PUCCH resource may be associated with an index or an identity (e.g. CORESETPoolIndex, TRP_ID, or a BFD-RS set ID/index but the invention should not be limited thereto). In the embodiment, the UE 110 may transmit the PUCCH resource corresponding to the scheduling request which is associated with a BFD-RS set or a TRP that might not be declared a beam failure. In addition, in the embodiment, the UE 110 may be configured or provided at least one schedulingRequestIDForBFR e.g., for PUCCH transmission with a beam failure recovery request and/or link recovery request (LRR), wherein each PUCCH resource may be associated with an index or an identity (e.g., CORESETPoolIndex, TRP_ID, candidate beam RS List ID, Panel ID, or TRP_ID), wherein each schedulingRequestIDForBFR may be associated with a PUCCH resource ID, wherein the UE 110 may transmit the scheduling request in the PUCCH resource with the PUCCH resource ID. Taking FIG. 13A for example, FIG. 13A is a schematic diagram of transmitting the PUCCH resource corresponding to the scheduling request according to an embodiment of the invention. As shown in FIG. 13A, the UE 110 may be configured two PUCCH resources respectively associated with corresponding scheduling request #0 and scheduling request #1 for reporting the information related to the BFR. If the UE 110 declares that a beam failure occurs in the TRP 120, the UE 110 may trigger the scheduling request #1 (configured by the RRC, but the invention should not be limited thereto) for reporting the information related to the BFR. Then, the UE 110 may transmit the PUCCH resource corresponding to the scheduling request #1 associated with the TRP 130 to the TRP 130. It should be noted that FIG. 13A is only used to illustrate the embodiment of the invention, but the invention should not be limited thereto.

Figure 13B:
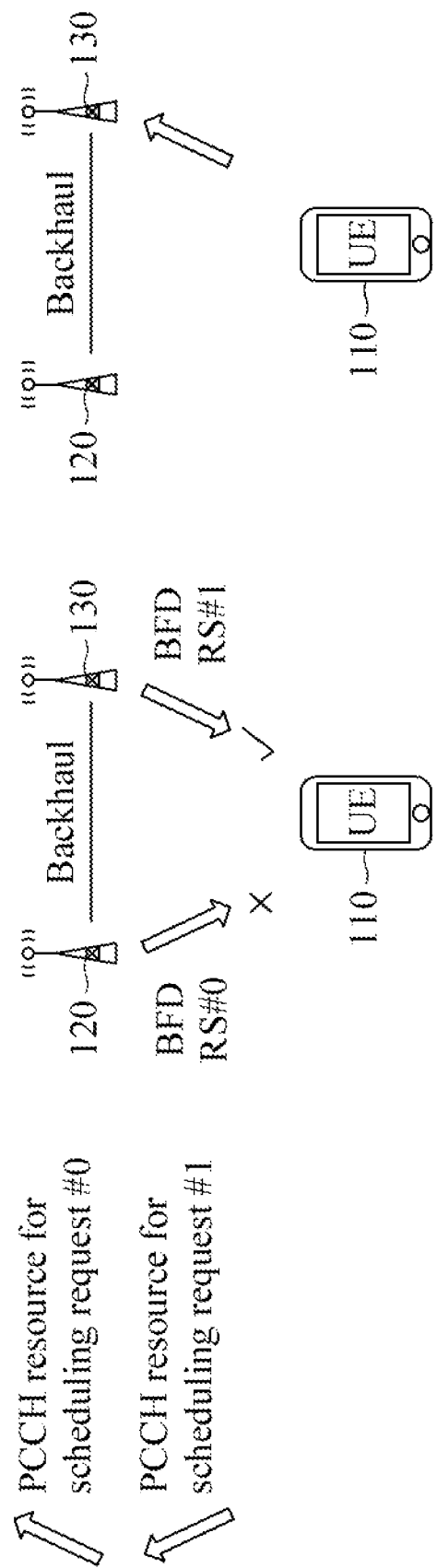
FIG. 13B is a schematic diagram of transmitting the PUCCH resource corresponding to the scheduling request according to an embodiment of the invention.

In another embodiment of the invention, the UE 110 may be configured at least one physical uplink control channel (PUCCH) resource associated with corresponding scheduling requests for reporting the information related to the BFR, each PUCCH resource may be associated with an index or an identity (e.g. CORESETPoolIndex, TRP_ID, or a BFD-RS set ID/index, but the invention should not be limited thereto). In the embodiment, when a beam failure occurs in a BFD-RS set or a TRP is declared by the UE 110, the UE 110 may transmit the PUCCH resource corresponding to the scheduling request which is associated with the TRP. Taking FIG. 13B for example, FIG. 13B is a schematic diagram of transmitting the PUCCH resource corresponding to the scheduling request according to another embodiment of the invention. As shown in FIG. 13B, the UE 110 may be configured two PUCCH resources respectively associated with corresponding scheduling request #0 and scheduling request #1 for reporting the information related to the BFR. If the UE 110 declares that a beam failure occurs in the TRP 120, the UE 110 may trigger the scheduling request #0 (configured by the RRC, but the invention should not be limited thereto) for reporting the information related to the BFR. Then, the UE 110 may transmit the PUCCH resource corresponding to the scheduling request #0 associated with the TRP 120 to the TRP 130. It should be noted that FIG. 13B is only used to illustrate the embodiment of the invention, but the invention should not be limited thereto.

Back to FIG. 3, in step S340, the UE 310 may report the information related to the BFR to the TRP 320.

In an embodiment of the invention, the UE 110 may determine whether to transmit a physical uplink shared channel (PUSCH) resource for accommodating the MAC CE for reporting the information related to the BFR according to the spatial relation information of the PUSCH resource. In the embodiment, the PUSCH resource may be scheduled by downlink control information (DCI) or semi-statically configured by higher layer parameter (e.g. configuredGrantConfig, but the invention should not be limited thereto).

For the PUSCH resource scheduled by DCI, the DCI may be associated with an index or an identity (e.g. CORESETPoolIndex, TRP_ID, group/set ID, or group/set index, but the invention should not be limited thereto). For example, the PUSCH resource #0 may be scheduled by a DCI in CORESET #A with CORESETPoolIndex 0 and the PUSCH resource #1 may be scheduled by a DCI in CORESET #B with CORESETPoolIndex 1.

For the PUSCH resource scheduled by semi-statically configured by higher layer parameter, configuredGrantConfig, the configuredGrantConfig may be associated with an index or an identity (e.g. CORESETPoolIndex, TRP_ID, group/set ID, or group/set index, but the invention should not be limited thereto). In addition, the configuredGrantConfig may comprise srs-ResourceIndicator. The indicated sound reference signal (SRS) resource configured by the configuredGrantConfig may be associated with an index or an identity (e.g. CORESETPoolIndex, TRP_ID, group/set ID, or group/set index, but the invention should not be limited thereto).

Figure 14A:
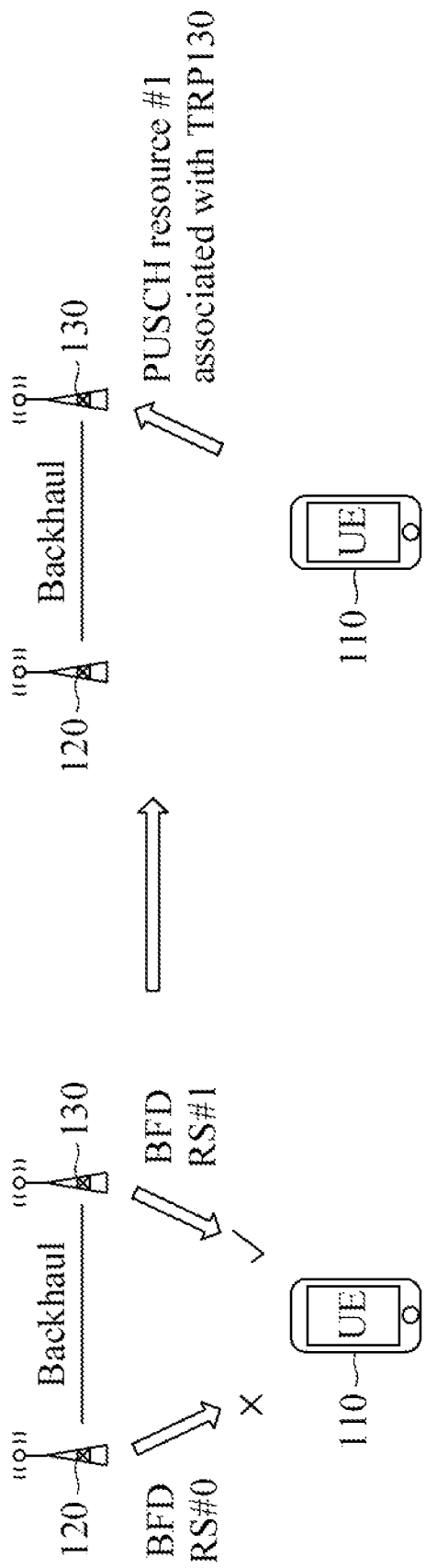
FIG. 14A is a schematic diagram of determining the PUSCH resource according to an embodiment of the invention.

If the available PUSCH resource for a new transmission associated with the TRP which has not been declared a beam failure, the UE 110 may transmit the PUSCH resource for accommodating the MAC CE for reporting the information related to the BFR. Taking FIG. 14A for example, FIG. 14A is a schematic diagram of determining the PUSCH resource according to an embodiment of the invention. As shown in FIG. 14A, when the TRP 120 is declared a beam failure by the UE 110 and the available PUSCH resource for a new transmission associated with the TRP 130 which has not been declared a beam failure, the UE 110 may transmit the PUSCH resource associated with the TRP 130 for accommodating the MAC CE for reporting the information related to the BFR. It should be noted that FIG. 14A is only used to illustrate the embodiment of the invention, but the invention should not be limited thereto.

If the available PUSCH resource for a new transmission associated with the TRP which is declared a beam failure the UE 110 may not transmit the PUSCH resource for accommodating the MAC CE for reporting the information related to the BFR and the UE 110 may trigger a scheduling request for the BFR. Taking FIG. 14B for example, FIG. 14B is a schematic diagram of determining the PUSCH resource according to another embodiment of the invention. As shown in FIG. 14B, when the TRP 120 is declared a beam failure by the UE 110 and the available PUSCH resource for a new transmission associated with the TRP 120, the UE 110 may not transmit the PUSCH resource associated with the TRP 120 for accommodating the MAC CE for reporting the information related to the BFR. The UE 110 may trigger a scheduling request for the BFR. It should be noted that FIG. 14B is only used to illustrate the embodiment of the invention, but the invention should not be limited thereto.

In an embodiment of the invention, if a TRP is declared a beam failure by the UE 110, the UE 110 may not perform uplink (UL) transmission which is associated with the TRP. The UL transmission may comprise PUCCH, random access channel (RACH), PUSCH (e.g. configured grant, dynamic grant), sound reference signal (SRS) and/or demodulation reference signal (DM-RS), but the invention should not be limited thereto.

In an embodiment of the invention, when the UE 110 determines (or finds) a candidate beam from the candidate-beam RS list(s) which associated with the TRP(s) that might not be declared a beam failure, the UE may report at least one of following information to the base station, wherein the information may comprise an index or an identity (e.g. CORESETPoolIndex, TRP_ID, group/set ID, or group/set index, but the invention should not be limited thereto) associated with TRP which is declared a beam failure, a candidate-beam RS ID and a serving cell index, but the invention should not be limited thereto. In the embodiment, the radio link quality of the candidate-beam RS with the reported candidate-beam RS ID may be higher than the serving BFD-RS. Taking FIG. 9A for example, as shown in FIG. 9A, the UE 110 may declare that a beam failure occurs in the TRP 120 and the UE 110 may perform a measurement of RS(s) within the candidate-beam RS list #1 associated with the TRP 130. When the UE 110 determines that the RS #$A_1$ within the candidate-beam RS list #1 is the candidate-beam RS for reporting the BFR information, the radio link quality of the RS #$A_1$ within the candidate-beam RS list #1 may be higher than the radio link quality of the serving BFD-RS #1 associated with the TRP 120. It should be noted that the above example is only used to illustrate the embodiment of the invention, but the invention should not be limited thereto.

In another embodiment of the invention, when the UE 110 determines a candidate beam from all of the candidate-beam RS lists, the UE may report at least one of following information to the base station, wherein the information may comprise an index or an identity (e.g. CORESETPoolIndex, TRP_ID, group/set ID, or group/set index, but the invention should not be limited thereto) associated with TRP which is declared a beam failure, a candidate-beam RS ID and a serving cell index, but the invention should not be limited thereto. In the embodiment, the radio link quality of the candidate-beam RS with the reported candidate-beam RS ID may be higher than the serving BFD-RS. Taking FIG. 9A for example, as shown in FIG. 9A, the UE 110 may declare that a beam failure occurs in the TRP 120 and the UE 110 may perform a measurement of RS(s) within the candidate-beam RS list #0 associated with the TRP 120 and the candidate-beam RS list #1 associated with the TRP 130. When the UE 110 determines that the RS #$A_1$ within the candidate-beam RS list #1 is the candidate-beam RS for reporting the BFR information, the radio link quality of the RS #$A_1$ within the candidate-beam RS list #1 may be higher than the radio link quality of the serving BFD-RS #1 associated with the TRP 120. It should be noted that the above example is only used to illustrate the embodiment of the invention, but the invention should not be limited thereto.

In another embodiment of the invention, when the UE 110 does not perform a measurement to determine a possible candidate beam, i.e. the UE may fallback to single TRP operation, the UE may report at least one of following information to the base station, wherein the information may comprise an index or an identity (e.g. CORESETPoolIndex, TRP_ID, group/set ID, or group/set index, but the invention should not be limited thereto) associated with the TRP which is declared a beam failure and a serving cell index, but the invention should not be limited thereto. For example, when a beam failure occurs in the TRP 120, the UE 110 may not perform a measurement of RS (s) within all of the candidate-beam RS lists. Then, the UE 110 may report an index or an identity (e.g. CORESETPoolIndex, TRP_ID, group/set ID, or group/set index, but the invention should not be limited thereto) associated with the TRP 120 and/or a serving cell index. It should be noted that the above example is only used to illustrate the embodiment of the invention, but the invention should not be limited thereto.

In another embodiment of the invention, when the UE 110 determines (or finds) a candidate beam from the candidate-beam RS list which associated with the TRP that may be declared a beam failure, the UE may report at least one of following information to the base station, wherein the information may comprise an index or an identity (e.g. CORESETPoolIndex, TRP_ID, group/set ID, or group/set index, but the invention should not be limited thereto) associated with TRP which is declared a beam failure, a candidate-beam RS ID and a serving cell index, but the invention should not be limited thereto. In the embodiment, the radio link quality of the candidate-beam RS with the reported candidate-beam RS ID may be higher than the serving BFD-RS. Taking FIG. 9D for example, as shown in FIG. 9D, the UE 110 may declare that a beam failure occurs in the TRP 120 and the UE 110 may perform a measurement of RS(s) within the candidate-beam RS list #0 associated with the TRP 120. When the UE 110 determines that the RS #$A_2$ within the candidate-beam RS list #0 is the candidate-beam RS for reporting the BFR information, the radio link quality of the RS #$A_2$ within the candidate-beam RS list #0 may be higher than the radio link quality of the serving BFD-RS #1 associated with the TRP 130. It should be noted that the above example is only used to illustrate the embodiment of the invention, but the invention should not be limited thereto.

In another embodiment of the invention, when the UE 110 determines (or finds) at least two candidate beams from all of the candidate-beam RS lists which associated with the serving TRPs, the UE may report at least one of following information to the base station, wherein the information may comprise an index or an identity (e.g. CORESETPoolIndex, TRP_ID, group/set ID, or group/set index, but the invention should not be limited thereto) associated with TRP which is declared a beam failure, at least two candidate-beam RS IDs of the candidate-beam RSs which may be received simultaneously and a serving cell index, but the invention should not be limited thereto. In the embodiment, the UE 110 cannot find any candidate-beam RS which may be received with the surviving BFD-RS simultaneously. Taking FIG. 9F for example, as shown in FIG. 9F, the UE 110 may declare that a beam failure occurs in the TRP 120 and the UE 110 may perform a measurement of RS(s) within the candidate-beam RS list #0 associated with the TRP 120 and the candidate-beam RS list #1 associated with the TRP 130 and. The UE 110 may not find any candidate-beam RS which may be received with the surviving BFD-RS #1 simultaneously. Then, the UE 110 finds the RS #$A_2$ within the candidate-beam RS list #0 and the RS #$A_1$ within the candidate-beam RS list #1 can be received simultaneously as the candidate-beam RSs for reporting the BFR information. It should be noted that the above example is only used to illustrate the embodiment of the invention, but the invention should not be limited thereto.

Figure 15:
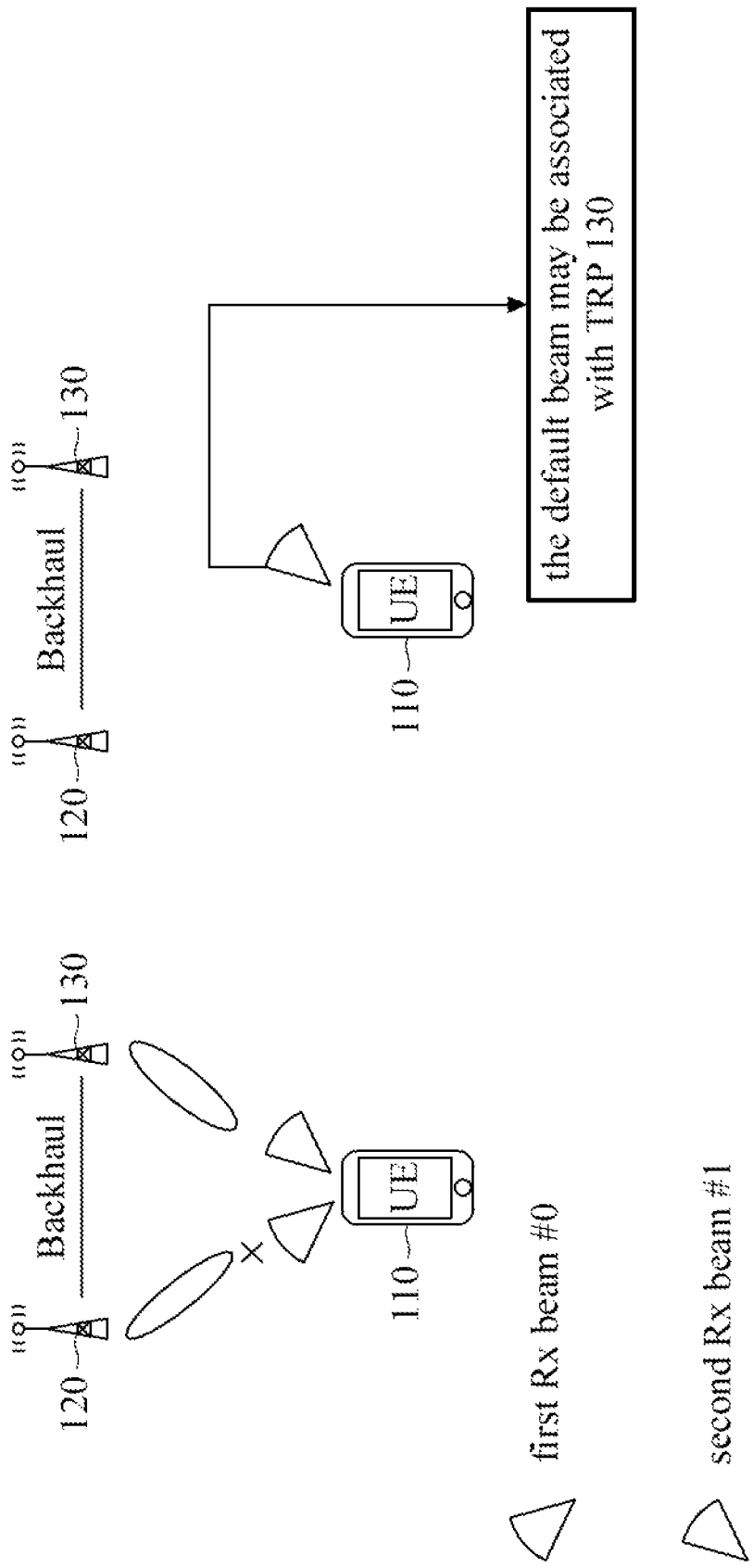
FIG. 15 is a schematic diagram of the default beam according to an embodiment of the invention.

In an embodiment of the invention, after the UE 110 reports the beam failure recovery request to the base station, the UE 110 may assume that the default beams are associated with an index or an identity (e.g. CORESETPoolIndex, TRP_ID, group/set ID, or group/set index, but the invention should not be limited thereto) corresponding to the TRP which might not be declared a beam failure. In the embodiment, after the UE 110 transmits PUCCH resource with a beam failure recovery request, after the UE 110 transmits the PUSCH resource for accommodating the MAC CE for reporting BFR related information or before the UE 110 receives the updating information of TCI state of CORESET, if the offset between the reception of the DCI and the corresponding PDSCH is less than the threshold timeDurationForQCL, the UE 110 may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of CORESETPoolIndex. The CORESETPoolIndex is associated with the TRP which might not be declared a beam failure. Taking FIG. 15 for example, FIG. 15 is a schematic diagram of the default beam according to an embodiment of the invention. In FIG. 15, it assumed that a first Rx beam #0 is in the antenna panel #A for receiving PDSCH resource transmitted from the TRP 120 and a second Rx beam #1 is in the antenna panel #B for receiving PDSCH resource transmitted from the TRP 130. As shown in FIG. 15, the UE 110 may declare that a beam failure occurs in the TRP 110. After the UE 110 reports beam failure recovery request, the default Rx beam (the second Rx beam #1) may be associated with the TRP 130 which has not been declared a beam failure by the UE 110. It should be noted that FIG. 15 is only used to illustrate the embodiment of the invention, but the invention should not be limited thereto.

Figure 16:
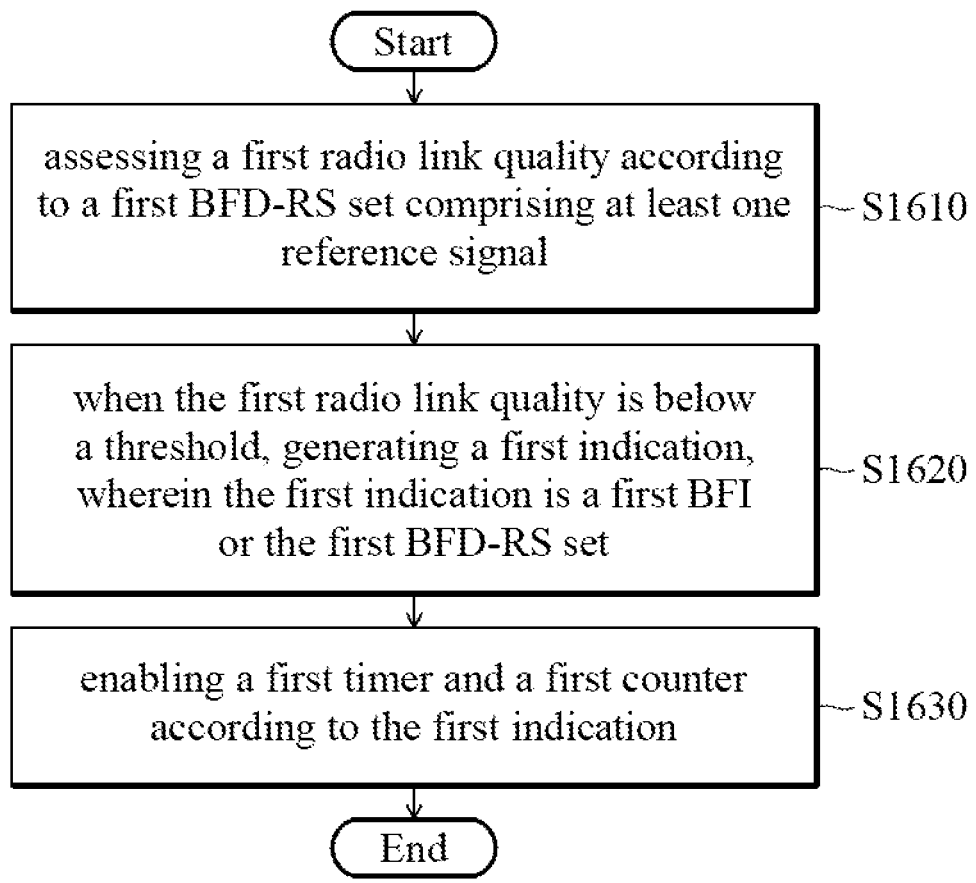
FIG. 16 is a flow chart 1600 illustrating a beam failure detection method according to an embodiment of the invention.

FIG. 16 is a flow chart 1600 illustrating a beam failure detection method according to an embodiment of the invention. The beam failure detection method may be applied to the UE 110. As shown in FIG. 16, in step S1610, a radio frequency (RF) signal processing device of the UE 110 assesses a first radio link quality according to a first BFD-reference signal (BFD-RS) set comprising at least one reference signal.

In step S1620, when the first radio link quality is below the a threshold, a processor of the UE 110 generates a first indication, wherein the first indication is a first beam failure instance (BFI) or the first BFD-RS set.

In step S1630, the processor of the UE 110 enables a first timer and a first counter according to the first indication.

According to some embodiments of the invention, in the BFD method, the first BFD-RS set is configured by network, wherein the first BFD-RS set is associated with a first group index or a first group identity.

According to some embodiments of the invention, in the BFD method, the processor determines the first BFD-RS set, wherein the at least one reference signal in the first BFD-RS set is associated with a first group index or a first group identity. In the embodiments, the at least one reference signal and a respective CORESET of the at least one reference signal are associated with a value of RS index indicated by a TCI-State.

According to some embodiments of the invention, in the BFD method, the first indication with a periodicity determined by the maximum between the shortest periodicity of the at least one reference signal and a fixed value.

According to some embodiments of the invention, the BFD method may further comprises that when a second radio link quality of a second reference signal is below the threshold, the processor of the UE 110 generates a second indication, and enables a second timer and the first counter, wherein the second indication is a second beam failure instance (BFI) or a second BFD-RS set. In the embodiments, the processor of the UE 110 performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the first counter to generate a second calculation result, and when the second calculation result is above or equal to a second threshold, the processor determines that a beam failure occurs associated with the second BFD-RS set, wherein the first calculation is a floor calculation and the second calculation is a module calculation.

According to some embodiments of the invention, the BFD method may further comprises that when a second radio link quality of a second reference signal is below the threshold, the processor of the UE 110 generates a second indication, and enables the first timer and the first counter, wherein the second indication is a second beam failure instance (BFI) or a second BFD-RS set. In the embodiments, when the first indication is generated, the processor updates the first timer through a third calculation and when a second indication is generated, the processor updates the first timer through a fourth calculation, wherein the third calculation is associated with a module calculation and the fourth calculation is associated with a floor calculation, and wherein the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the first counter to generate a second calculation result, wherein when the second calculation result is above or equal to a second threshold, the processor determines that a beam failure occurs is associated with the second BFD-RS set, wherein the first calculation is the floor calculation and the second calculation is the module calculation. In some embodiments, the first timer and the second timer may be configured in a lower layer of the UE 110.

According to some embodiments of the invention, the BFD method may further comprises that when a second radio link quality is below the threshold, the processor of the UE 110 generates a second indication, and enables a second timer and a second counter, wherein the second indication is a second beam failure instance (BFI) or a second BFD-RS set. In the embodiments, the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the second counter to generate a second calculation result, wherein when the second calculation result is above or equal to a second threshold, the processor determines that a beam failure occurs associated with the second BFD-RS set, wherein the first calculation is for calculating the number of first indications and the second calculation is for calculating the number of second indications.

According to some embodiments of the invention, the BFD method may further comprises that the RF signal processing device of the UE 110 transmits a first scheduling request for a beam failure recovery (BFR), wherein the first scheduling request is associated with the first BFD-RS set. In one embodiment, the RF signal processing device transmits a first physical uplink control channel (PUCCH) resource corresponding to the first scheduling request, when a beam failure associated with a second BFD-RS set occurs. In another embodiment, the RF signal processing device transmits a first PUCCH resource corresponding to the first scheduling request, when a beam failure associated with the first BFD-RS set occurs.

According to some embodiments of the invention, the BFD method may further comprises that the processor of the UE 110 determines whether to transmit a physical uplink shared channel (PUSCH) resource for accommodating a medium-access-channel control-element (MAC CE) for reporting information related to a BFR. In the embodiments, if an available PUSCH resource for a new transmission associated with the first BFD-RS set which has not been declared a beam failure, the processor determines to transmit the PUSCH resource for accommodating the MAC CE for reporting information related to the BFR, and if an available PUSCH resource for a new transmission associated with a second BFD-RS set which has been declared a beam failure, the processor determines not to transmit the PUSCH resource for accommodating the MAC CE for reporting information related to the BFR.

According to some embodiments of the invention, the BFD method may further comprises that the processor of the UE 110 assumes that at least one demodulation reference signal (DM-RS) port of PDSCH is associated with a BFD-RS set which has not been declared a beam failure.

According to the BFD method provided in the invention, the BFR can be triggered if control beams of one TRP are failure. Therefore, the BFD method provided in the invention may achieve batter resource utilization and save the power of the UE.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g. including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g. code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment (UE) for beam failure detection (BFD), comprising:
a radio frequency (RF) signal processing device, assessing a first radio link quality according to a first BFD-reference signal (BFD-RS) set comprising at least one reference signal; and
a processor, coupled to the RF signal processing device, wherein when the first radio link quality is below a threshold, the processor generates a first indication, wherein the first indication is a first beam failure instance (BFI) or the first BFD-RS set,
wherein the processor enables a first timer and a first counter according to the first indication,
wherein the RF signal processing device transmits a first scheduling request for a beam failure recovery (BFR), wherein the first scheduling request is associated with the first BFD-RS set,
wherein the first indication with a periodicity determined by the maximum between the shortest periodicity of the at least one reference signal and a fixed value.

2. The UE as claimed in claim 1, wherein the first BFD-RS set is configured by network, wherein the first BFD-RS set is associated with a first group index or a first group identity.

3. The UE as claimed in claim 1, the processor determines the first BFD-RS set, wherein the at least one reference signal in the first BFD-RS set is associated with a first group index or a first group identity.

4. The UE as claimed in claim 3, wherein the at least one reference signal and a respective CORESET of the at least one reference signal are associated with a value of RS index indicated by a TCI-State.

5. The UE as claimed in claim 1, wherein when a second radio link quality of a second reference signal is below the threshold, the processor generates a second indication, and enables a second timer and the first counter, wherein the second indication is a second beam failure instance (BFI) or a second BFD-RS set.

6. The UE as claimed in claim 5, wherein the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the first counter to generate a second calculation result, and when the second calculation result is above or equal to a second threshold, the processor determines that a beam failure occurs associated with the second BFD-RS set, wherein the first calculation is a floor calculation and the second calculation is a module calculation.

7. The UE as claimed in claim 1, wherein when a second radio link quality of a second reference signal is below the threshold, the processor generates a second indication, and enables the first timer and the first counter, wherein the second indication is a second beam failure instance (BFI) or a second BFD-RS set.

8. The UE as claimed in claim 7, wherein when the first indication is generated, the processor updates the first timer through a third calculation and when a second indication is generated, the processor updates the first timer through a fourth calculation, wherein the third calculation is associated with a module calculation and the fourth calculation is associated with a floor calculation, and wherein the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the first counter to generate a second calculation result, wherein when the second calculation result is above or equal to a second threshold, the processor determines that a beam failure occurs is associated with the second BFD-RS set, wherein the first calculation is the floor calculation and the second calculation is the module calculation.

9. The UE as claimed in claim 8, wherein the first timer and the second timer are configured in a lower layer of the UE.

10. The UE as claimed in claim 1, wherein when a second radio link quality is below the threshold, the processor generates a second indication, and enables a second timer and a second counter, wherein the second indication is a second beam failure instance (BFI) or a second BFD-RS set.

11. The UE as claimed in claim 10, wherein the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the second counter to generate a second calculation result, wherein when the second calculation result is above or equal to a second threshold, the processor determines that a beam failure occurs associated with the second BFD-RS set, wherein the first calculation is for calculating the number of first indications and the second calculation is for calculating the number of second indications.

12. The UE as claimed in claim 1, wherein the RF signal processing device transmits a first physical uplink control channel (PUCCH) resource corresponding to the first scheduling request, when a beam failure associated with a second BFD-RS set occurs.

13. The UE as claimed in claim 1, wherein the RF signal processing device transmits a first PUCCH resource corresponding to the first scheduling request, when a beam failure associated with the first BFD-RS set occurs.

14. The UE as claimed in claim 1, wherein the processor determines whether to transmit a physical uplink shared channel (PUSCH) resource for accommodating a medium-access-channel control-element (MAC CE) for reporting information related to a BFR.

15. The UE as claimed in claim 14, wherein if an available PUSCH resource for a new transmission associated with the first BFD-RS set which has not been declared a beam failure, the processor determines to transmit the PUSCH resource for accommodating the MAC CE for reporting information related to the BFR, and if an available PUSCH resource for a new transmission associated with a second BFD-RS set which has been declared a beam failure, the processor determines not to transmit the PUSCH resource for accommodating the MAC CE for reporting information related to the BFR.

16. The UE as claimed in claim 1, wherein the processor assumes that at least one demodulation reference signal (DM-RS) port of PDSCH is associated with a BFD-RS set which has not been declared a beam failure.

17. A beam failure detection (BFD) method, applied to user equipment (UE), comprising:
    assessing, by a radio frequency (RF) signal processing device of the UE, a first radio link quality according to a first BFD-reference signal (BFD-RS) set comprising at least one reference signal;
    when the first radio link quality is below a threshold, generating, by the processor, a first indication, wherein the first indication is a first beam failure instance (BFI) or the first BFD-RS set; and
    enabling, by the processor, a first timer and a first counter according to the first indication,
    wherein the BFD method further comprises:
    transmitting, by the RF signal processing device, a first scheduling request for a beam failure recovery (BFR), wherein the first scheduling request is associated with the first BFD-RS set,
    wherein the first indication with a periodicity determined by the maximum between the shortest periodicity of the at least one reference signal and a fixed value.

18. The BFD method as claimed in claim 17, wherein the first BFD-RS set is configured by network, wherein the first BFD-RS set is associated with a first group index or a first group identity.

19. The BFD method as claimed in claim 17, further comprising:
    determining, by the processor, the first BFD-RS set, wherein the at least one reference signal in the first BFD-RS set is associated with a first group index or a first group identity.

20. The BFD method as claimed in claim 19, wherein the at least one reference signal and a respective CORESET of the at least one reference signal are associated with a value of RS index indicated by a TCI-State.

21. The BFD method as claimed in claim 17, further comprising:
    when a second radio link quality of a second reference signal is below the threshold, generating, by the processor, a second indication, and enables a second timer and the first counter, wherein the second indication is a second beam failure instance (BFI), or a second BFD-RS set.

22. The BFD method as claimed in claim 21, further comprising:
    performing, by the processor, a first calculation for a first value of the first counter to generate a first calculation result, wherein when the first calculation result is above or equal to a first threshold, the processor determines that a beam failure occurs associated with the first BFD-RS set; and
    performing, by the processor, a second calculation for a second value of the first counter to generate a second calculation result, wherein when the second calculation result is above or equal to a second threshold, the processor determines that a beam failure occurs associated with the second BFD-RS set,
    wherein the first calculation is a floor calculation and the second calculation is a module calculation.

23. The BFD method as claimed in claim 17, further comprising:
    when a second radio link quality of a second reference signal is below the threshold, generating, by the processor, a second indication, and enables the first timer and the first counter, wherein the second indication is a second beam failure instance (BFI), or a second BFD-RS set.

24. The BFD method as claimed in claim 23, further comprising:
when the first indication is generated, the processor updates the first timer through a third calculation and when the second indication is generated, the processor updates the first timer through a fourth calculation, wherein the third calculation is associated with a module calculation and the fourth calculation is associated with a floor calculation, and
wherein the processor performs a first calculation for a first value of the first counter to generate a first calculation result, wherein when the first calculation result is above or equal to a first threshold, the processor determines that a beam failure occurs associated with the first BFD-RS set, and the processor performs a second calculation for a second value of the first counter to generate a second calculation result, wherein when the second calculation result is above or equal to a second threshold, the processor determines that a beam failure occurs is associated with a second BFD-RS set, wherein the first calculation is the floor calculation and the second calculation is the module calculation.

25. The BFD method as claimed in claim 24, wherein the first timer and the second timer are configured in a lower layer of the UE.

26. The BFD method as claimed in claim 17, wherein when a second radio link quality is below the threshold, the processor generates a second indication, and enables a second timer and a second counter, wherein the second indication is a second beam failure instance (BFI), or a second BFD-RS set.

27. The BFD method as claimed in claim 26, further comprising:
the processor performs a first calculation for a first value of the first counter to generate a first calculation result, wherein when the first calculation result is above or equal to a first threshold, the processor determines that a beam failure occurs associated with the first BFD-RS set; and
the processor performs a second calculation for a second value of the second counter to generate a second calculation result, wherein when the second calculation result is above or equal to a second threshold, the processor determines that a beam failure occurs associated with a second BFD-RS set,
wherein the first calculation is for calculating the number of first indications and the second calculation is for calculating the number of second indications.

28. The BFD method as claimed in claim 17, further comprising:
transmitting, by the RF signal processing device, a first physical uplink control channel (PUCCH) resource corresponding to the first scheduling request, when a beam failure associated with a second BFD-RS set occurs.

29. The UE as claimed in claim 17, further comprising:
transmitting, by the RF signal processing device, a first PUCCH resource corresponding to the first scheduling request, when a beam failure associated with the first BFD-RS set occurs.

30. The BFD method as claimed in claim 17, further comprising:
determining, by the processor, whether to transmit a physical uplink shared channel (PUSCH) resource for accommodating a medium-access-channel control-element (MAC CE) for reporting information related to a BFR.

31. The BFD method as claimed in claim 30, further comprising:
if an available PUSCH resource for a new transmission associated with the first BFD-RS set which has not been declared a beam failure, the processor determines to transmit the PUSCH resource for accommodating the MAC CE for reporting information related to the BFR; and
if an available PUSCH resource for a new transmission associated with a second BFD-RS set which has been declared a beam failure, the processor determines not to transmit the PUSCH resource for accommodating the MAC CE for reporting information related to the BFR.

32. The BFD method as claimed in claim 17, wherein the processor assumes that at least one demodulation reference signal (DM-RS) port of PDSCH is associated with a BFD-RS set which has not been declared a beam failure.

33. The UE as claimed in claim 1, wherein for a Bandwidth Part (BWP) of a serving cell, if the UE is not provided the first BFD-RS set, the processor determines the first BFD-RS set, wherein the first BFD-RS set is associated with a first CORESET, wherein the UE is provided a first value of CORESETPoolIndex for the first CORESET.

34. The UE as claimed in claim 33, wherein the first BFD-RS set includes the at least one reference signal which is periodic, wherein the at least one reference signal with the same values as the RS indexes in the RS sets indicated by TCI state for the first CORESRT.

35. The UE as claimed in claim 1, wherein the UE is provided by a first scheduling request a first configuration for a first physical uplink control channel (PUCCH) transmission associated with a first link recovery request (LRR) and a second configuration for a second PUCCH transmission associated with a second LRR, wherein the UE uses the first configuration to transmit the first PUCCH and uses the second configuration to transmit the second PUCCH, wherein the first LRR associated with the first BFD-RS set and the second LRR associated with the second BFD-RS set.

36. The UE as claimed in claim 35, the second configuration is associated with a second scheduling request.

37. The UE as claimed in claim 35, if a beam failure recovery (BFR) associated with the first BFD-RS set has been triggered, the UE triggers the first scheduling request for the BFR of the first BDF-RS set for which the BFR has been triggered.

38. The BFD method as claimed in claim 17, wherein for a Bandwidth Part (BWP) of a serving cell, if the UE is not provided the first BFD-RS set, the processor determines the first BFD-RS set, wherein the first BFD-RS set is associated with a first CORESET, wherein the UE is provided a first value of CORESETPoolIndex for the first CORESET.

39. The BFD method as claimed in claim 38, wherein the first BFD-RS set includes the at least one reference signal which is periodic, wherein the at least one reference signal with the same values as the RS indexes in the RS sets indicated by TCI state for the first CORESRT.

40. The BFD method as claimed in claim 17, wherein the UE is provided by a first scheduling request a first configuration for a first physical uplink control channel (PUCCH) transmission associated with a first link recovery request (LRR) and a second configuration for a second PUCCH transmission associated with a second LRR, wherein the UE uses the first configuration to transmit the first PUCCH and uses the second configuration to transmit the second PUCCH, wherein the first LRR associated with the first BFD-RS set and the second LRR associated with the second BFD-RS set.

41. The BFD method as claimed in claim 40, the second configuration is associated with a second scheduling request.

42. The BFD method as claimed in claim 40, further comprising:
    if a beam failure recovery (BFR) associated with the first BFD-RS set has been triggered, triggering, by the UE, the first scheduling request for the BFR of the first BDF-RS set for which the BFR has been triggered.

\* \* \* \* \*